United States Patent
Mayell et al.

(10) Patent No.: US 11,081,966 B2
(45) Date of Patent: Aug. 3, 2021

(54) MULTI ZONE SECONDARY BURST MODULATION FOR RESONANT CONVERTERS

(71) Applicant: POWER INTEGRATIONS, INC., San Jose, CA (US)

(72) Inventors: Robert J. Mayell, Los Altos, CA (US); Yueming Wang, Gilroy, CA (US); Roger Colbeck, Ottawa (CA)

(73) Assignee: POWER INTEGRATIONS, INC., San Jose, CA (US)

( * ) Notice: Subject to any disclaimer, the term of this patent is extended or adjusted under 35 U.S.C. 154(b) by 76 days.

(21) Appl. No.: 16/688,660

(22) Filed: Nov. 19, 2019

(65) Prior Publication Data

US 2020/0195154 A1   Jun. 18, 2020

Related U.S. Application Data

(60) Provisional application No. 62/779,296, filed on Dec. 13, 2018.

(51) Int. Cl.
  *H02M 3/335* (2006.01)
  *H02M 1/08* (2006.01)
  *H02M 1/00* (2006.01)

(52) U.S. Cl.
  CPC ....... *H02M 3/33569* (2013.01); *H02M 1/083* (2013.01); *H02M 3/33507* (2013.01); *H02M 3/33515* (2013.01); *H02M 2001/0035* (2013.01); *H02M 2001/0058* (2013.01)

(58) Field of Classification Search
  CPC ..................... H02M 3/33507; H02M 3/33515

USPC .......................................... 363/21.02, 78, 79
See application file for complete search history.

(56) References Cited

U.S. PATENT DOCUMENTS

| | | | |
|---|---|---|---|
| 7,733,669 B2 | 6/2010 | Jiao et al. | |
| 8,014,176 B2 | 9/2011 | Melanson et al. | |
| 8,279,628 B2 | 10/2012 | Melanson | |
| 8,379,420 B2 | 2/2013 | Orr | |
| 8,503,891 B2 | 8/2013 | Mashimo et al. | |
| 8,508,958 B2 | 8/2013 | Orr et al. | |
| 8,582,321 B2 | 11/2013 | Li et al. | |
| 9,112,425 B2 | 8/2015 | Prescott et al. | |

(Continued)

OTHER PUBLICATIONS

TEA19161T—"Digital Controller for high-efficiency resonant power supply," Rev. 1, Mar. 10, 2016, NXP Semiconductors, 46 pages.

*Primary Examiner* — Gary A Nash
(74) *Attorney, Agent, or Firm* — Christensen O'Connor Johnson Kindness PLLC

(57) ABSTRACT

A power converter controller includes a control loop clock generator to generate a switching frequency signal responsive to a burst load threshold, a power signal, and a load signal. A switching frequency of the switching frequency signal is above a mechanical audio resonance range of an energy transfer element and above an audible noise frequency. A burst control circuit generates a burst on signal and a burst off signal in response to a feedback signal and a burst enable signal to operate the controller in a plurality of burst modes. A burst frequency of the burst on signal or the burst off signal is less than the mechanical audio resonance range. A request transmitter circuit generates a request signal responsive to the switching frequency signal, the burst on signal, and the burst off signal to control switching of a switching circuit.

42 Claims, 9 Drawing Sheets

(56) References Cited

U.S. PATENT DOCUMENTS

| | | | |
|---|---|---|---|
| 9,143,043 B2* | 9/2015 | Zhang | H02M 3/33546 |
| 2011/0085354 A1 | 4/2011 | Wang et al. | |
| 2011/0176335 A1 | 7/2011 | Li et al. | |
| 2012/0127761 A1 | 5/2012 | Halberstadt et al. | |
| 2014/0369097 A1* | 12/2014 | Prescott | H02M 1/4225 |
| | | | 363/89 |
| 2015/0244274 A1* | 8/2015 | Fahlenkamp | H02M 3/33592 |
| | | | 363/21.15 |
| 2018/0054134 A1 | 2/2018 | Moon et al. | |

* cited by examiner

MULTI ZONE SECONDARY BURST MODULATION FOR RESONANT CONVERTERS

RELATED APPLICATIONS

This application claims the benefit of U.S. Provisional Application No. 62/779,296, filed Dec. 13, 2018, which is incorporated in its entirety herein by reference.

BACKGROUND INFORMATION

Field of the Disclosure

The present invention relates generally to power converters, and more specifically to switched mode power converters.

Background

Electronic devices use power to operate. Switched mode power converters are commonly used due to their high efficiency, small size, and low weight to power may of today's electronics. Conventional wall sockets provide a high voltage alternating current (ac). In a switching power converter, the high voltage ac input is converted to provide a well-regulated direct current (dc) output through an energy element. The switched mode power converter usually provides output regulation by sensing one or more output quantities and controlling the output in a closed loop. In operation, a switch is utilized to provide the desired output by varying the duty cycle (typically the ratio of the on time of the switch to the total switching period), varying the switching frequency, or varying the number of pulses per unit time of the switch in a switched mode power converter. Varying the duty cycle may be referred to as pulse width modulation (PWM) control, while varying the switching frequency may be referred to as pulse frequency modulation (PFM) control.

One type of switched mode power converter topology is a resonant switched mode power converter, which utilizes a resonant inductance-capacitance (LC) circuit as part of the power conversion process. In general, resonant switched mode power converters with PFM control may have some advantages compared to non-resonant converters, such as operating at higher switching frequencies with lower switching losses, utilizing smaller magnetic elements (and therefore utilizing smaller packaging), and still operating with high efficiency. Resonant power converters generally do not have waveforms with sharp edges (e.g., waveforms having high di/dt or dv/dt), and as such electromagnetic interference (EMI) performance may be improved and allow the use of smaller EMI filters as compared to non-resonant converters.

LLC converters are a type of resonant switched mode power converter, which utilizes the resonance between two inductors and a capacitor. LLC converters are popular due to the savings on cost and size by utilizing the magnetizing and leakage inductance of the power converter's energy transfer element as part of the resonance component of the LLC converter. In addition, LLC converters may achieve zero voltage switching, which may result in lower switching losses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1A:
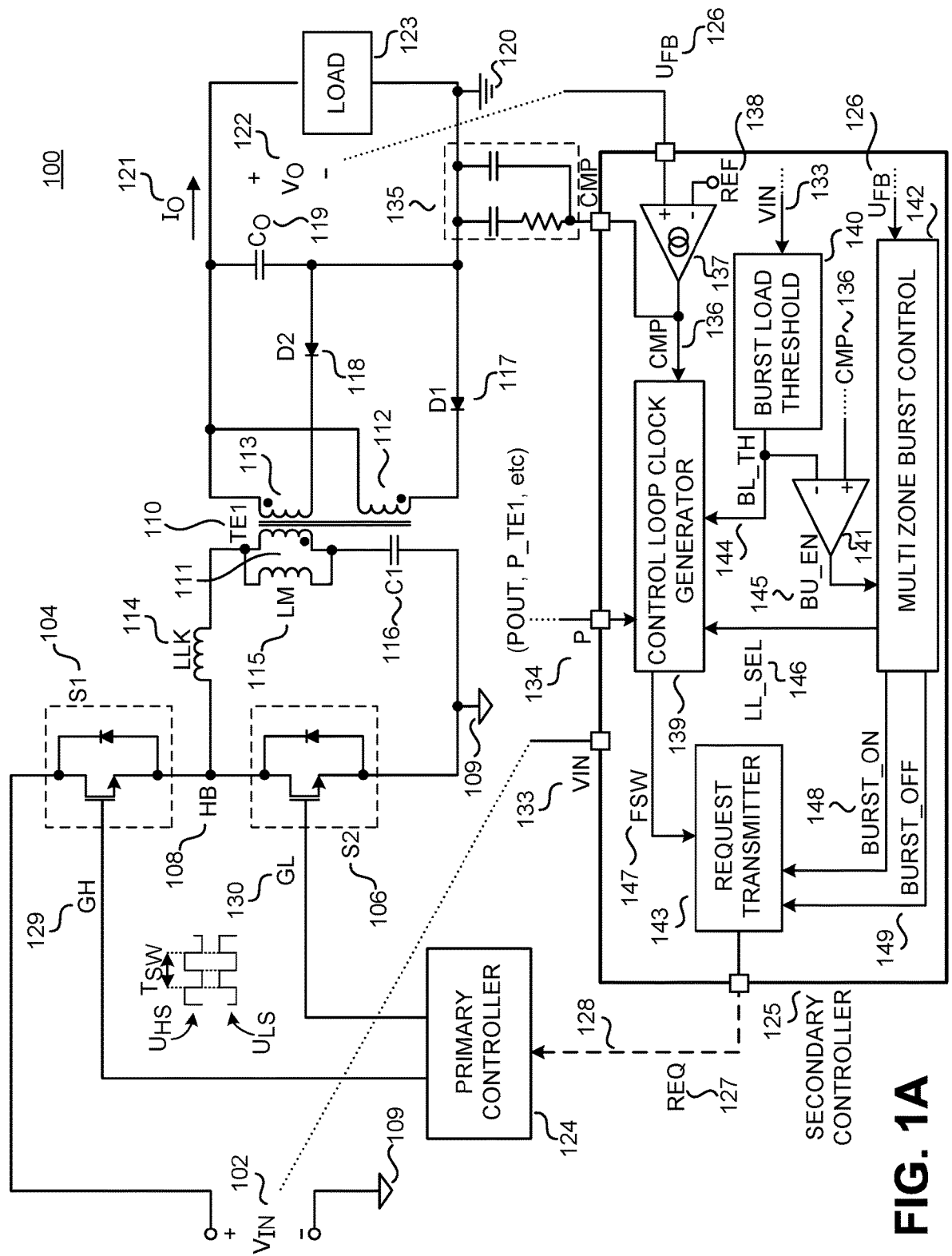
FIG. 1A is a functional block diagram illustrating one example of a power converter with a secondary controller including a multi zone burst control that receives an input signal and a power signal in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a resonant switched mode power converter including multiple zones of burst control are described herein. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment," "an embodiment," "one example," or "an example"

means that a particular feature, structure or characteristic described in connection with the embodiment or example is included in at least one embodiment of the present invention. Thus, appearances of the phrases "in one embodiment," "in an embodiment," "one example," or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Resonant converters, such as LLC converters, typically include a resonant tank circuit that includes a tank inductance and a tank capacitance, as found for instance in LLC circuits. Resonant converters may take advantage of soft switching control to provide output voltage without the associated high switching losses, high switching stress on the power switch, and high EMI caused by fast switching edges.

Soft switching the power switch of an LLC converter may also enable zero voltage switching (ZVS) in which the voltage across the power switch is substantially zero when the power switch is turned ON which may reduce the switching losses for the LLC converter. For the example of a half-bridge LLC converter, two power switches (referred to as a high side switch and a low side switch in a half bridge switching circuit) are used to control the transfer of energy from the input of the power converter to the output of the power converter. The power switches are controlled such that when one power switch is ON, the other power switch is OFF, and the two power switches are generally controlled to be ON for substantially equal amounts of time under steady-state conditions. In general, a switch that is ON (or closed), may conduct current, while a switch that is OFF (or open) does not typically conduct current. In one example, the first switch is ON while the second switch is OFF. The first switch is turned OFF with a non-zero current. After the first switch turns OFF, the voltage across the second switch will typically reduce. Soft switching generally refers to turning ON the second switch as the voltage across the second switch reaches near-zero. Using this type of switching prevents energy loss from discharge of the capacitance across the terminals of the switch during switch turn-on. To achieve ZVS, the power switches are controlled such that there is a period of time, referred to as "dead time," where both power switches are OFF prior to one of the power switches turning ON. Further, during the "dead time" period when both switches are OFF, the voltage across one of the power switches may be reduced to zero and once at zero volts, this switch could be turned ON with minimal switching loss (achieving ZVS).

Further, LLC converters may be designed to control the power switches to reduce power consumption at no load or low load operating conditions. One method for reducing power consumption at no load or low load operating conditions may be referred to as burst mode control. During no load or low load power conditions, the power switches are not continuously turned ON and OFF to deliver the required output power. Rather, the power switches may be controlled in burst mode, where they are sequentially turned ON and OFF for an interval of time (usually referred to as burst on time, burst on duration, and/or burst on period) followed by an interval of no switching (usually referred to as burst off time, burst off duration, and/or burst off period). The individual high-side and low-side switching events during the entire burst on time are sometimes referred to as the burst-on packet. The burst repetition frequency may refer to the rate at which the converter cycles through burst-on and burst-off. Or in other words, the burst period is the sum of the burst on time and the burst off time, with the burst frequency as the inverse of the burst period.

In one example under nominal conditions an LLC may sequentially switch low-side and high-side (sometimes referred to as half-cycles) with a full-cycle (a period of one low-side and one high-side half-cycle) switching frequency greater than the human audible range, and thus any audio noise generated at this switching frequency would be imperceptible to humans. In this example it is generally understood that frequencies beyond 20 kilohertz (kHz), are not audible by humans. In one example when an LLC converter is operating in burst mode control, it is possible that the burst repetition frequency could fall within the frequency of human audible range. As such the burst repetition frequency may be perceptible to one nearby such a power converter. In one instance a power supply designers may prefer to not generate perceptible noise. In examples described herein, the burst frequency is controlled such that the frequency is maintained above the human audible range. Further, due to the construction of the energy transfer element (e.g., transformer) of the LLC converter, the transformer also has a mechanical resonance range that could cause the transformer to mechanically ring. The energy transfer element may be mechanically excited and caused to move/vibrate/expand/contract based on the electrical switching impulses it is subjected to. The transformer mechanical resonance range should also be avoided and in one example may fall at approximately 7 kHz-12 kHz. The mechanical resonance is a gain term where by small excitations within the mechanical resonant range may be amplified and lead to larger mechanical variations which may be emitted as audible noise from the energy transfer element. In one example excitations of the energy transfer element outside the mechanical resonance range will be attenuated and not produce meaningful audio noise from the energy transfer element. Accordingly, in examples described herein, the burst repetition frequency is controlled to remain significantly below the mechanical resonance range and the high-side and low-side switching frequency is also controlled to remain significantly above the mechanical resonance range in accordance with the teachings of the present invention. It is appreciated that the present invention applies to both energy transfer elements constituted as a single magnetic structure as well as those where the energy transfer element is split into multiple magnetic structures.

Under steady burst off conditions, the tank current through the resonant tank circuit of an LLC converter is substantially zero. When the LLC converter enters a burst on state from a burst off state, the tank current is substantially zero and the first switching cycle of burst on state is hard-switched. Hard switching generally refers to turning ON the high side switch or the low side switch when the tank current is substantially zero and/or the voltage across one or more of the switches is non-zero. Soft switching also refers to turning ON and OFF the high side switch or the low side switch when the tank current is substantially non-zero and/or the voltage across one or more of the switches is substantially zero. After the initial switched cycle in the burst on period, the subsequent switching cycles or switching pulses during burst on period of the switches after the initial active hard-switched partial cycle are soft-switched. Due to this initial hard-switched cycle for the burst on period, it is advantageous to for the burst-on package to group as many switching cycles after this initial hard-switched cycle. Or in other words, the initial hard-switched cycle may be followed by a multiplicity of soft-switched cycles, which may better distribute the losses of the first hard-switched cycle. However, switching a longer burst-on package also may lead to a lower burst repetition frequency. As such, controlling the burst frequency below the transformer mechanical resonance frequency range may result in less lost power due to switching losses than would be possible if controlling the burst frequency above the audible noise frequency and above the transformer resonance frequency range.

Examples of the present disclosure employ a multi zone burst control to control the burst frequency below the audible noise frequency and the transformer mechanical resonance frequency range. As will be discussed, the multi zone burst in one example includes full mode, intermediate burst mode, light load burst mode, and super light load burst mode. The controller enables the multi zone burst control substantially in response to the load. The transition between the different zones of burst is responsive to the feedback signal received by the controller and representative of the output of the power converter. In one example, the feedback signal is substantially regulated to a regulation value VREG, but may be controlled to vary between a minimum value VMIN and a maximum value VMAX. In one example, the minimum value is less than the regulation value VREG while the maximum value VMAX is greater than the regulation value VREG.

In one example, the controller for the power converter operates in intermediate burst mode when the load falls below a threshold. During intermediate burst mode, the controller regulates the feedback signal between the regulation value VREG and the minimum value VMIN and the burst repetition frequency is set to a substantially fixed intermediate burst repetition frequency (the intermediate burst period). In one example, the fixed intermediate burst frequency is set substantially below the mechanical resonance frequency range of the energy transfer element. In intermediate burst mode, the burst off period is the time it takes for the feedback signal to decrease from the regulation value VREG to the minimum value VMIN. The length of time it takes for the feedback signal to decrease from the regulation value VREG to the minimum value VMIN is also referred to as the decay time TDECAY. Once the feedback signal reaches the minimum value VMIN, the burst on period begins. The length of the burst on period is substantially the fixed intermediate burst period minus the burst off period.

During intermediate burst mode, the decay time TDECAY (burst-off period), should increase as the load decreases. The controller transitions from intermediate burst mode to light load burst mode when the decay time TDECAY is greater than a threshold T1. During light load burst mode, the feedback signal is allowed to vary between the minimum value VMIN and the maximum value VMAX. The burst off period is substantially the length of time for the feedback signal UFB to decrease from the maximum value VMAX and the minimum value VMIN. The burst on period is substantially the length of time for the feedback signal to increase from the minimum value VMIN to the maximum value VMAX.

During light load burst mode, the burst off period increases as the load decreases. The controller transitions from light load burst mode to super light load burst mode when the burst off period is greater than a threshold T3. In super light load burst, the burst-off period is substantially fixed to the threshold T3. In super-light mode, the burst-on period begins at an arbitrary output voltage somewhere between VMAX and VMIN. For a given set of operating conditions the burst-on period duration is substantially functionally fixed to a threshold length T4 and is the time taken for the output voltage to reach VMAX. There is also an absolute maximum burst-on period, which may not be exceeded in super-light mode.

FIG. 1A is a functional block diagram illustrating one example of a power converter 100 including a secondary controller 125 with a burst control circuit, shown as multi zone burst control 142, that receives an input signal and a power signal in accordance with the teachings of the present invention. Also shown is a primary controller 124, which together with secondary controller 125 may be referred to as the controller of the power converter 100. As shown, the primary controller 124 is on the primary side of the power converter 100 and referenced to input return 109 while the secondary controller 125 in one example may be galvanically isolated from primary controller 124, and is on the secondary side of the power converter 100 and referenced to output return 120. However, it should be appreciated that the primary controller 124 and the secondary controller 125 may not be galvanically isolated from each other. The power converter 100 shown in FIG. 1A is a resonant power converter coupled in a half-bridge topology with synchronous rectifiers at its output. It should be appreciated that other power converter topologies (resonant or not) could be used with embodiments of the present invention.

In the depicted example, power converter 100 is shown as including a switching circuit, which include switches S1 104 and S2 106, coupled to an input of the power converter 100 and an energy transfer element TE1 110 that is coupled between the input and the output of the power converter 100. The primary controller 124 is coupled to generate first and second drive signals GH 129 and GL 130 to control switching of switches S1 104 and S2 106, respectively, to control the transfer of energy from the input of the power converter to the output of the power converter. Switch S1 104 may also be referred to as a high side switch while switch S2 106 may be referred to as a low side switch. A resonant tank circuit is also coupled to switches S1 104 and S2 106. The resonant tank circuit includes tank inductance and a tank capacitance. In the depicted example, the resonant tank circuit is an LLC circuit such that the tank inductance includes a leakage inductance LLK 114 and a transformer magnetizing inductance LM 115 of the energy transfer element TE1 110. The tank capacitance includes capacitance C1 116. The leakage inductance LLK 114 and the transformer magnetizing inductance LM 115 may be either discrete components or combined into a single transformer with leakage and magnetizing elements, such as the energy transfer element TE1 110.

As illustrated, the power converter 100 is coupled to receive an input voltage VIN 102 on the primary side and provides output power to the load 123 coupled to the output of the power converter 100 on the secondary side. High side switch S1 104 is coupled to receive the input voltage VIN 102 at one end, and is coupled to the low side switch S2 106 at the other end. The low side switch S2 106 is further coupled to input return 109. The terminal between the high side switch S1 104 and the low side switch S2 106 may be referred to as the half bridge terminal HB 108. In the example shown, both the high side switch S1 104 and the low side switch S2 106 are illustrated as n-type metal oxide semiconductor field effect transistors (MOSFETs) along with their respective body diodes. The high side switch S1 104 and the low side switch S2 106 are controlled with first and second drive signals GH 129 and GL 130 such that the voltage across a primary winding 111 of the energy transfer element TE1 110 is substantially a square wave.

As shown, the energy transfer element TE1 110 includes the primary winding 111, a first output winding 112, and a second output winding 113. The primary winding 110 is coupled to the high side switch S1 104 and low side switch S2 106. In the depicted example, the first output winding 112 and the second output winding 113 are center tapped, or in other words, the terminal between the first output winding 112 and the second output winding 113 are coupled to the output. The first output winding 112 is coupled to output rectifier D1 117 while the second output winding 113 is coupled to output rectifier D2 118. As shown in the example illustrated in FIG. 1A, rectifiers D1 117 and D2 118 are diodes. However, in another example, rectifiers D1 117 and D2 118 may be transistors used as synchronous rectifiers and could be controlled by signals output by the secondary controller 125. Energy is transferred and rectified by output rectifier D1 117 when the high side switch S1 104 is turned ON and the low side switch S2 106 is turned OFF. When the high side switch S1 104 is turned OFF and the low side switch S2 106 is turned ON, energy is transferred and rectified by output rectifier D2 118. One end of the output capacitor $C_O$ 119 is coupled to rectifiers D1 117 and D2 118, and output return 120. The other end of the output capacitor $C_O$ 126 is coupled to the first output winding 112 and the second output winding 113. The load 123 is coupled across the output capacitor $C_O$ 119. An output may be provided to the load 123 and may be provided as either an output voltage $V_O$ 122, output current $I_O$ 121, or a combination of the two.

Power converter 100 may have a primary side and a secondary side, which in one example are galvanically isolated from each other meaning there is no dc current path to allow current to flow from the primary side to the secondary side of the power converter 100. A controller coupled to the primary side on an input side of the power converter is generally referred to as a primary controller 124 while a controller coupled to the secondary side on the output side of the power converter is referred to as a secondary controller 125. The primary controller and secondary controller may communicate via a communication link 128 across the galvanic isolation using an inductive coupling such as a transformer or a coupled inductor. The primary controller 124 and secondary controller 125 may be implemented on separate integrated circuit (IC) dice that may either be packaged in a single IC package or packaged in separate IC packages. An integrated circuit package typically includes a lead frame to provide mechanical support for the die or dice within the IC package.

The power converter 100 further includes circuitry to regulate the output. A feedback signal $U_{FB}$ 126 representative of the output of the power converter 100, which may be output voltage $V_O$ 122, output current $I_O$ 121, or a combination of the two, is provided to the secondary controller 125 and may be a voltage signal or a current signal. The secondary controller 125 is coupled to receive the feedback signal $U_{FB}$ 126 and outputs a request signal REQ 127. In response to the feedback signal $U_{FB}$ 126, the secondary controller 125 determines whether or how much energy should be delivered from the primary side to the secondary side of the power converter 100. Secondary controller 125 outputs the request signal REQ 127 to the primary controller 124 via the communication link 128. The communication link 128 may provide galvanic isolation between primary controller 124 and the secondary controller 125 and may be implemented by using devices such as an opto-coupler, a capacitor, a magnetic coupling, or an inductive coupling. In one example, the inductive coupling that forms the communication link 128 may include conductive loops formed of lead frames that support the primary 124 and secondary controller 125.

The request signal REQ 127 may be representative of one or more commands to control the switching of the high side switch S1 104 and the low side switch S2 106. The request signal REQ 127 may be a rectangular pulse waveform that pulses to a logic high value and quickly returns to a logic low value. For instance, in one example, a grouping of M number of pulses in the request signal REQ 127 corresponds to a "burst on" command and the primary controller 124 begins switching either the high side switch S1 104 or the low side switch S2 106. A single pulse in the request signal REQ 127 corresponds to a "switch" command and the primary controller 124 turns OFF whichever high side switch S1 104 or low side switch S2 106 is currently conducting, and in one example after a deadtime, turns ON whichever switch was not conducting. Further, a grouping of N number of pulses in the request signal REQ 127 corresponds to a "burst off" command and the primary controller 124 stops switching both the high side switch S1 104 and the low side switch S2 106, turning both switches OFF. The primary controller 124 could include a decoder to decode the commands from the request signal REQ 127. However, it should be appreciated that in other examples, other schemes could be used to transmit burst on, burst off, and switch commands in accordance with the teachings of the present invention.

The secondary controller 125 shown also receives the input voltage signal VIN 133 and the power signal P 134 and determines the switching frequency/period of the high side switch S1 104 and the low side switch S2 106. The input voltage signal VIN 133 is representative of the sensed input voltage VIN 102 and may be a voltage or current signal. Power signal P 134 may be representative of one or more of the sensed output power (POUT), power delivered by the energy transfer element TE1 110 (P_TE1), input power, and power processed by the converter. In various examples, the power signal P 134 may be a voltage signal or a current signal. The secondary controller 125 utilizes the feedback signal $U_{FB}$ 126, input voltage signal VIN 133 and the power signal P 134 to determine the switching frequency/period of the request signal REQ 127 via a switching frequency signal FSW 147.

As shown, the secondary controller 125 includes a transconductance amplifier 137, control loop clock generator 139, burst load threshold circuit 140, comparator 141, and multi zone burst control 142. Transconductance amplifier 137 is coupled to receive the feedback signal $U_{FB}$ 126 and a reference 138. The output of the transconductance amplifier 137 is the load signal CMP 136. In operation, the output of the transconductance amplifier 137 is a current responsive to the difference between the feedback signal $U_{FB}$ 126 and reference 138. The greater the difference between the feedback signal $U_{FB}$ 126 and reference 138, the larger the magnitude of output current from the transconductance amplifier 137. It is understood that the transconductance amplifier may be linear or non-linear. The output of the transconductance amplifier 137 is coupled to a compensation circuit 135, which is shown external to the secondary controller 125. In the example shown, the compensation circuit 135 is coupled to output return 120 and includes a resistor and capacitor coupled together in series along with a capacitor coupled in parallel to the series coupled resistor and capacitor. The compensation circuit 135 provides loop compensation for the feedback loop of the power converter 100. Further, the compensation circuit 135 may alter the response time of the feedback loop of the power converter 100. With the compensation circuit 135, the load signal CMP 136 received by the control loop clock generator 139 may be a voltage. In one example, a larger load signal CMP 136 corresponds to a smaller output load 123. In other words, the load signal CMP 136 increases as the load 123 decreases.

The control loop clock generator 139 receives the power signal P 134 and the load signal CMP 136 and outputs the switching frequency signal FSW 147 to the request transmitter 143. The switching frequency signal FSW 147 is representative of the switching frequency of the primary switches, high side switch S1 104 and low side switch S2 106, and may be a rectangular pulse waveform with logic high and logic low sections. For an LLC converter, the logic high and logic low sections are generally substantially of equal length. The control loop clock generator 139 utilizes the power signal P 134 and the load signal CMP 136 to determine the lengths of the logic high and logic low sections. It should be appreciated that the power signal P 134 maybe optional, and the control loop clock generator 139 may include a voltage controlled oscillator (VCO) or other schemes which are responsive to the load signal CMP 136 to determine the lengths of the logic high and logic low sections.

In addition, the control loop clock generator 139 receives the light load select signal LL_SEL 146 and the burst load threshold BL_TH 144. In operation, when the light load select signal LL_SEL 146 is asserted, the control loop clock generator 139 utilizes the burst load threshold BL_TH 144 or a scaled version of the burst load threshold BL_TH 144 instead of the load signal CMP 136 to determine the switching frequency and output the switching frequency signal FSW 147 (i.e., the lengths of the logic high and logic low sections of the switching frequency signal FSW 147). In other words, when operating in light load burst or super light load burst, the burst load threshold BL_TH 144 or scaled version of the burst load threshold BL_TH 144 is used (in place of CMP 136), to generate the switching frequency signal FSW 147.

The switching frequency signal FSW 147 is received by the request transmitter 143. The frequency of the request signal REQ 127 is responsive to the switching frequency set by the switching frequency signal FSW 147. In one example, at every leading and trailing edge of the switching frequency signal FSW 147, the request transmitter 143 outputs a pulse in the request signal REQ 127 to turn on either the high side switch S1 104 or the low side switch S2 106. In one example, a leading edge in the switching frequency signal FSW 147 corresponds to turning ON the high side switch S1 104 (and turning OFF the low side switch S2 106) while a trailing edge corresponds to turning ON the low side switch S2 106 (and turning OFF the high side switch S1 104). In other words, a logic high value of the switching frequency signal FSW 147 generally corresponds to the conduction time of the high side switch S1 104 while a logic low generally corresponds to the conduction time of the low side switch S2 106. The switching period of the frequency signal FSW 147 corresponds to the switching period of both the high side switch S1 104 and the low side switch S2 106.

Burst load threshold circuit 140 receives the input voltage signal VIN 133 and determines a burst load threshold BL_TH 144 for the power converter 100. The burst load threshold BL_TH 144 is a threshold that is used to determine when the power converter 100 is in a load condition where the load 123 is fairly small. In other words, burst load threshold BL_TH 144 may be representative of a load condition where the power converter 100 would like to reduce power consumption by entering burst mode. In one example, the burst load threshold BL_TH 144 increases in response to increasing input voltage VIN 102. The burst load threshold BL_TH 144, or a scaled version of the burst load threshold BL_TH 144 is outputted to the control loop clock generator 129 and comparator 141.

Comparator 141 is coupled to receive the load signal CMP 136 and the burst load threshold BL_TH 144, and outputs the burst enable signal BU_EN 145 to the multi zone burst control 142. When the load signal CMP 136 is greater than the burst load threshold BL_TH 144, this may indicate that the power converter 100 is in a load condition which could benefit from the power converter 100 operating in burst mode. In operation, burst enable BU_EN 145 is logic high when the load signal CMP 136 is greater that the burst load threshold BL_TH 144.

The burst enable signal BU_EN 145 is received by the multi zone burst control 142 and enables the multi zone burst control 142 when the secondary controller 125 determines that the power converter 100 is in light load. Multi zone burst control 142 is also coupled to receive the feedback signal $U_{FB}$ 126 and outputs the light load select signal LL_SEL 146 to the control loop clock generator 139.

As mentioned above and as will be further discussed with reference to FIGS. 3A and 3B, the light load select signal LL_SEL 146 is used to indicate to the control loop clock generator 139 whether to utilize the load signal CMP 136 or the burst load threshold BL_TH 144 (or a scaled version of the burst load threshold BL_TH 144) to generate the switching frequency signal FSW 147 and set the switching frequency of the primary switches, high side switch S1 104 and low side switch S2 106

When enabled, the multi zone burst control 142 utilizes the feedback signal $U_{FB}$ 126 to determine whether the secondary controller 125 should control the power converter 100 into burst mode and which mode of burst to operate in. When the multi zone burst control 142 is not enabled, the secondary controller 125 is operating in "full frequency" mode and the high side switch S1 104 and the low side switch S2 106 are continuously switching in response to the frequency signal FSW 147.

Multi zone burst control 142 outputs the burst on signal BURST_ON 148 and the burst off signal BURST_OFF 149 to the request transmitter 143. When the multi zone burst control 142 asserts the burst on signal BURST_ON 148, the request transmitter 143 is allowed to send pulses in the request signal REQ 127 to turn ON and OFF the high side switch S1 104 and low side switch S2 106. Further, in response to an asserted burst on signal BURST_ON 148, the request transmitter 143 may send M number of grouped pulses to indicate that a "burst on" command is being transmitted. When the multi zone burst control 142 asserts the burst off signal BURST_OFF 149, the request transmitter is prevented from sending pulses on the request signal REQ 127 and high side switch S1 104 and low side switch S2 106 are not turned ON. Further, in response to the asserted burst off signal BURST_OFF 149, the request transmitter 143 may send N number of grouped pulses to indicate that a "burst off" command is being transmitted. BURST_ON 148 and BURST_OFF 149 are rectangular with varying lengths of logic high and logic low sections. In one implementation, a logic high corresponds to asserting the signal while a logic low corresponds to deasserting the signal. In one example BURST_ON 148 and BURST_OFF 149 are inverses of each other. Further, the BURST_ON 148 and BURST_OFF 149 signals are not simultaneously asserted. The repetition frequency of either the BURST_ON 148 or BURST_OFF 149 may be referred to as the burst frequency. The period of the burst frequency can be measured in steady state operation from sequential assertion of BURST_ON to the next assertion of BURST_ON, or from sequential assertion of BURST_OFF to the next assertion of BURST_OFF).

The multi zone burst control 142 operates the burst frequency below the audible noise frequency and the transformer resonance frequency range. The multi zone burst control 142 includes intermediate burst, light load burst, and super light load burst. The transition between the different zones of burst is responsive to the feedback signal $U_{FB}$ 126. As will be further discussed, the feedback signal $U_{FB}$ 126 is generally regulated to a regulation value VREG and may vary between a minimum value VMIN and a maximum value VMAX.

During intermediate burst mode, the primary controller 124 and secondary controller 125 substantially regulate the feedback signal $U_{FB}$ 126 between the regulation value VREG and the minimum value VMIN. Further, the burst period, and ergo the burst frequency, is set to a substantially fixed value, which will be shown as threshold period T2 below. The burst off period (i.e., the length of time that the burst off signal BURST_OFF 149 is asserted) is substantially the time it takes for the feedback signal $U_{FB}$ 126 to decrease from the regulation value VREG to the minimum value VMIN. The length of time it takes for the feedback signal to decrease from the regulation value VREG to the minimum value VMIN is also referred to as the decay time TDECAY. Once the feedback signal $U_{FB}$ 126 reaches the minimum value VMIN, the burst on period begins (i.e., the length of time that the burst on signal BURST_ON 148 is asserted). The length of burst on is substantially a fixed intermediate burst period minus the burst off period. During intermediate burst, the decay time TDECAY should increase as the load decreases. The multi zone burst control 142 transitions from intermediate burst to light load burst when the decay time TDECAY is greater than a threshold T1.

During light load burst, the feedback signal $U_{FB}$ 126 is controlled to substantially vary between the minimum value VMIN and the maximum value VMAX. The burst off period (i.e., when burst off signal BURST_OFF 149 is asserted) is substantially the length of time for the feedback signal $U_{FB}$ 126 to decrease from the maximum value VMAX to the minimum value VMIN. The burst on period (i.e., when burst on signal BURST_ON 148 is asserted) is substantially the length of time for the feedback signal $U_{FB}$ 126 to increase from the minimum value VMIN to the maximum value VMAX. During light load burst, the burst off period substantially increases as the load 123 decreases. The multi zone burst control 142 transitions from light load burst to super light load burst when the burst off period is greater than a threshold T3. When in super light load burst, the length of the burst off period (i.e., when burst off signal BURST_OFF 149 is asserted) is substantially fixed to threshold T3 and the burst on period (i.e., when burst on signal BURST_ON 148 is asserted) is substantially fixed to a threshold length T4. In one example, the burst off period is substantially fixed to a maximum threshold T3. In a further example, the feedback signal $U_{FB}$ 126 could reach the maximum value VMAX prior to the threshold length T4.

If one example, if the maximum value VMAX is reached prior to the end of the threshold period T4, the switching frequency signal is set to the maximum switching frequency FMAX. In another example, if the maximum value VMAX is reached prior to the end of the threshold period T4, the burst on period is terminated.

Figure 1B:
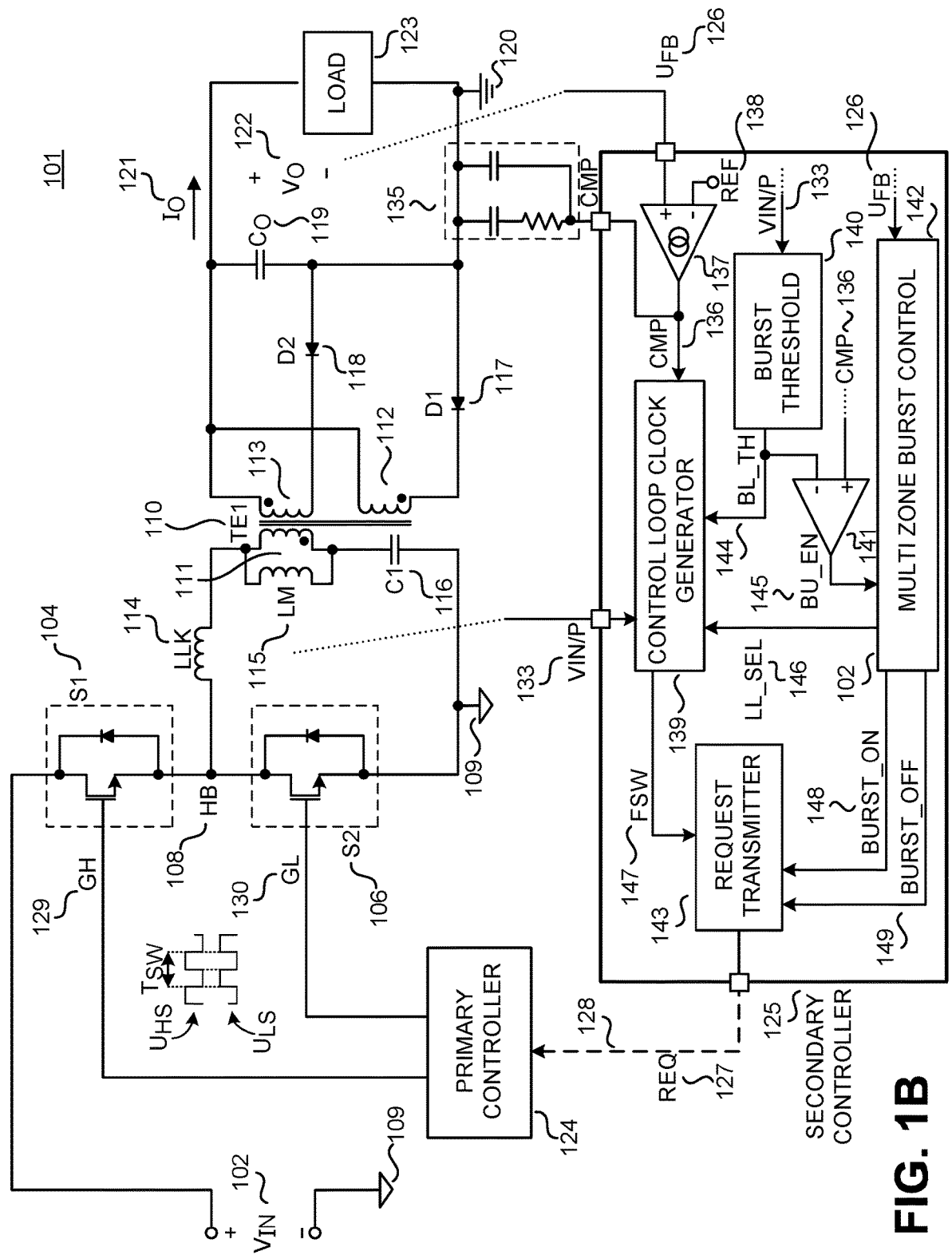
FIG. 1B is a functional block diagram illustrating another example of a power converter with a secondary controller including a multi zone burst control that receives a combined input signal and power signal in accordance with the teachings of the present invention.

FIG. 1B is a functional block diagram illustrating another example of a power converter including a secondary controller with a multi zone burst control that receives a combined input signal and power signal in accordance with the teachings of the present invention. It is appreciated that similarly named and numbered elements from FIG. 1B are coupled and function similarly to like elements described in FIG. 1A. However, the input voltage sense signal VIN and the power signal P discussed in FIG. 1A are combined into a single signal (VIN/P 133) in the example depicted in FIG. 1B. As shown, the combined signal of input voltage and power (VIN/P 133) is shown as being received by the control loop clock generator 139 and the burst load threshold circuit 140. In one example, the combined input voltage and power signal VIN/P 133 may be sensed from the primary winding 111 of energy transfer element TE1 110. It should be appreciated that the combined input voltage and power signal (VIN/P 133) maybe optional, and the control loop clock generator 139 may include a voltage controlled oscillator (VCO) or other schemes which are responsive to the load signal CMP 136 to determine the lengths of the logic high and logic low sections.

Figure 2:
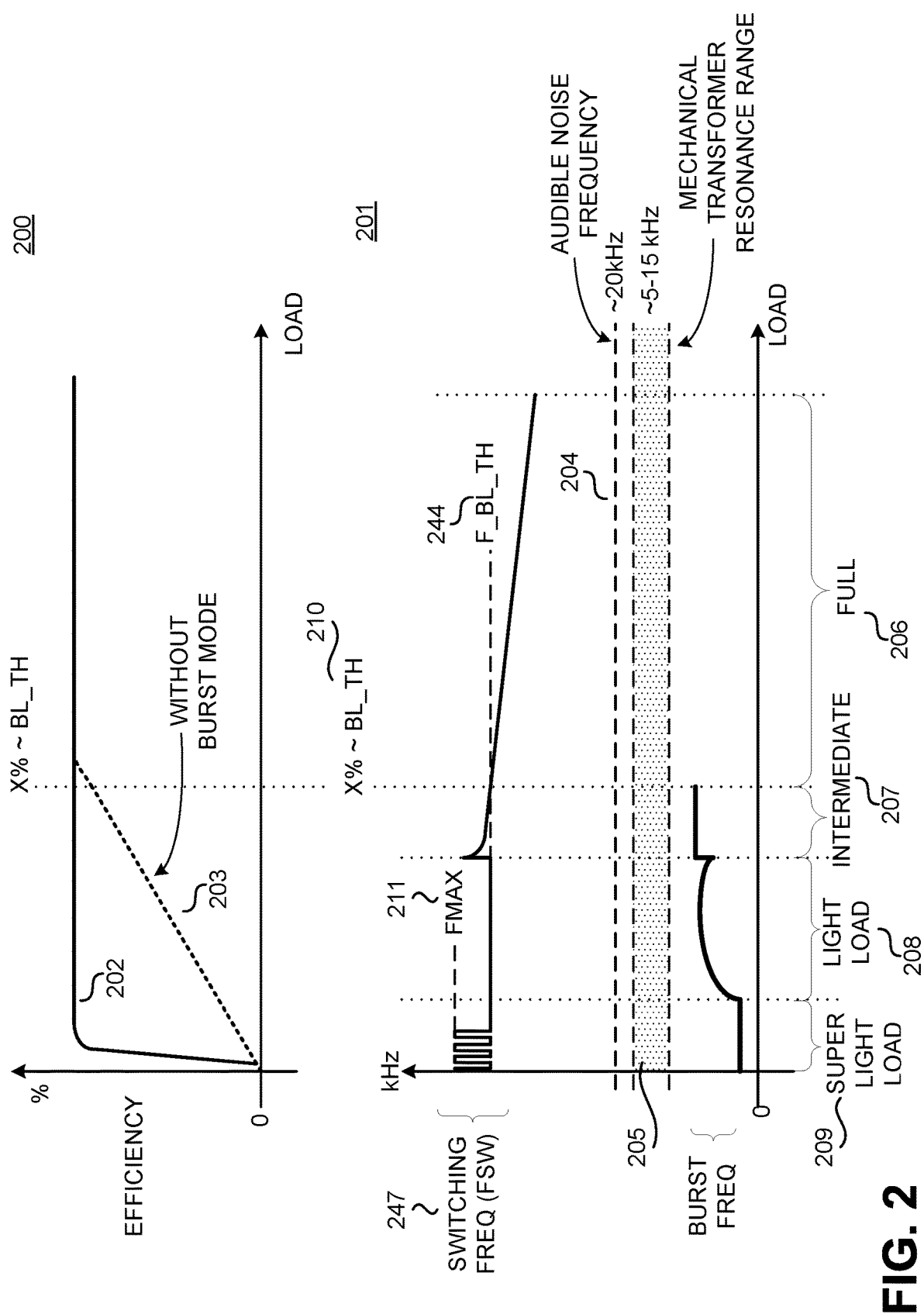
FIG. 2 illustrates example waveforms of the efficiency, switching frequency, and burst frequency with respect to load for the example power converters and secondary controllers of FIGS. 1A and 1B in accordance with the teachings of the present invention.

FIG. 2 illustrates example waveforms of the efficiency, switching frequency, and burst frequency with respect to load for the example power converters and secondary controllers of FIGS. 1A and 1B in accordance with the teachings of the present invention. It should be appreciated that similarly named and numbered elements are coupled and function as described above. As shown, diagram 200 illustrates the general relationship between efficiency with respect to load. The dashed line 203 illustrates the efficiency of the power converter without burst mode. The efficiency naturally decreases around X % of the load capacity of the power converter. As discussed, the burst load threshold BL_TH 110/210 may be chosen as a function of this percentage with respect to FIGS. 1A and 1B, to enter burst mode close to X %, the point where system efficiency would otherwise fall. The solid line 202 illustrates the efficiency of the power converter with a controller which utilizes a multi zone burst mode control. As shown, the efficiency shown by solid line 202 decreases at a much lower load as compared to dashed line 203.

Diagram 201 illustrates the switching frequency and burst frequency of the power converter 100 with respect to the load 123. For resonant converters, the switching frequency generally decreases with increasing load. During full mode 206, the switching frequency signal FSW 247 is shown as decreasing with load. At full mode 206, the multi zone burst mode control 142 asserts the burst on signal BURST_ON 148 and the high side switch S1 104 and low side switch S2 106 are continuously switching.

When the load is less than X %, which is generally related to burst load threshold BL_TH 210, multi-zone burst is enabled and the power converter 100 is operating in intermediate burst 207. During intermediate burst 207, the switching frequency signal FSW 247 increases as the load decreases, the switching frequency signal FSW 247 is not completely constant as it varies to get back to regulation and then settles during each burst on cycle. Further, the burst frequency, whose burst period is the sum of the burst on period and r the burst off period, is substantially constant during intermediate burst 207.

In light load burst 208, the switching frequency signal FSW 247 is set to a fixed burst load threshold value, F_BL_TH 244, which is the switching frequency set by the control loop clock generator 139 in response to the burst load threshold BL_TH 210 or closely related burst power delivery voltage. The burst frequency in light load burst 208 is variable. In one example, the burst frequency is parabolic during light load burst 208. Or in other words, the burst frequency increases and then decreases with decreasing load.

In super light load burst 209, the switching frequency signal FSW 247 may be substantially equal to F_BL_TH 244, however under certain conditions the switching frequency signal FSW 247 may optionally increase to the maximum switching frequency FMAX 211. As shown, the switching frequency in super light load burst 209 may toggle between F_BL_TH 244 and FMAX 211. The burst frequency in super light load burst 209 is substantially fixed. In one example, the fixed burst frequency in super light load burst 209 is much lower than the fixed burst frequency in intermediate burst mode.

Dashed line 204 and dotted region 205 illustrate a maximum human audible noise frequency (e.g., ~20 kHz) and a transformer resonance range (e.g., ~5-15 kHz), respectively. As shown, the switching frequency signal FSW 247 is controlled to be above the audible noise frequency 204 and the transformer resonance range 205 while the burst frequency is controlled below the audible noise frequency 204 and the transformer resonance range 205 in accordance with the teachings of the present invention.

Figure 3A:
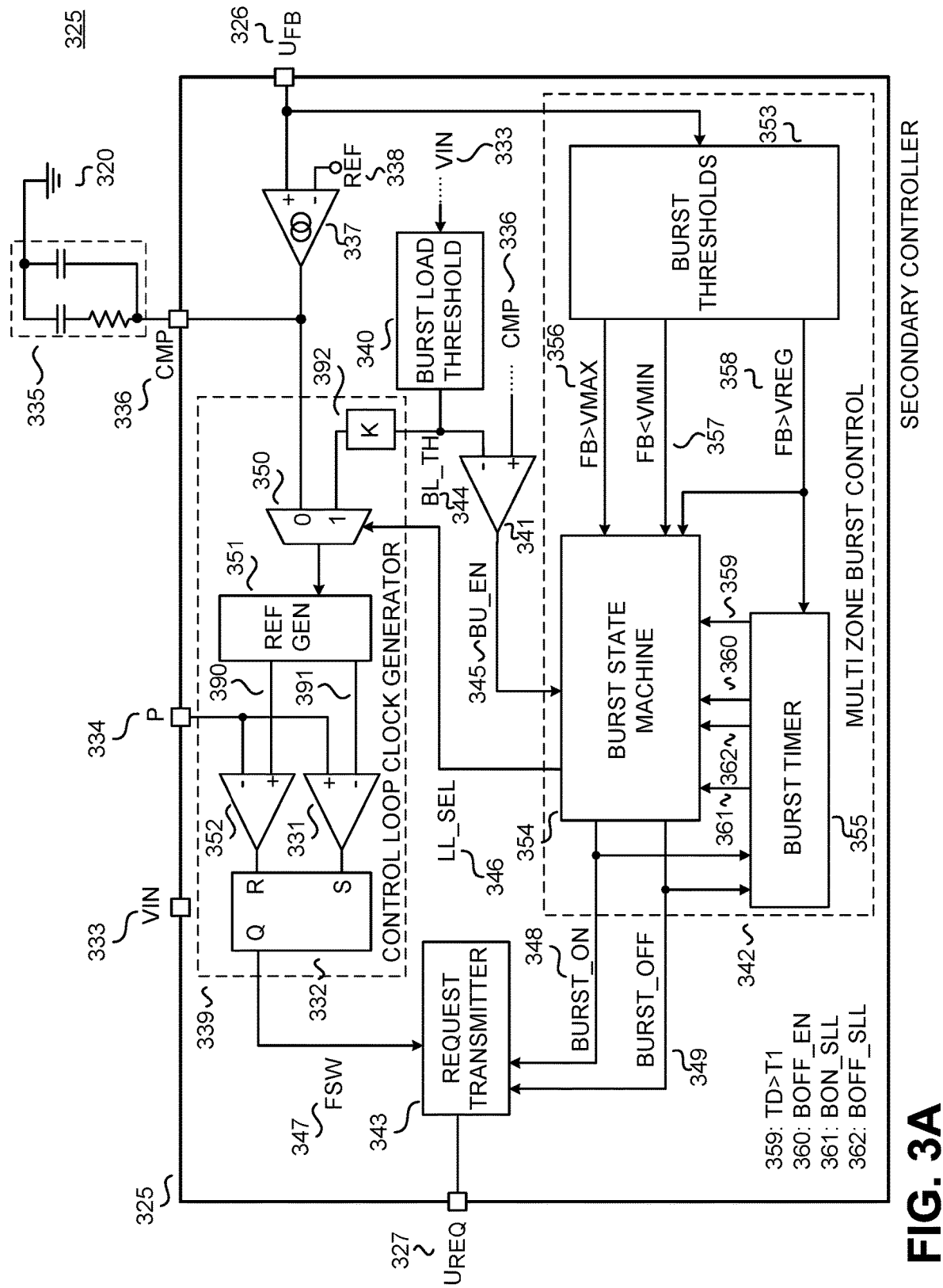
FIG. 3A is an example functional block diagram of the example secondary controller in accordance with the teachings of the present invention.

FIG. 3A is an example functional block diagram of the example secondary controller 325 in accordance with the teachings of the present invention. It is appreciated that secondary controller 325 of FIG. 3A may be one example of secondary controller 125 of FIGS. 1A or 1B, and that similarly named or numbered elements are coupled and function as described above. The example secondary controller 325 in FIG. 3A shows the input voltage signal VIN 33 and power signal P 334 as two separate signals. However, in another example, it is appreciated that the combined signal VIN/P 133 shown in FIG. 1B may also be utilized. As shown in FIG. 3A, the control loop clock generator 339 includes a multiplexer (MUX) 350, a reference generator 351, comparators 352 and 331, latch 332, and a scaling block K 392. Scaling block K 392 receives the burst load threshold BL_TH 344 and outputs a scaled version of the burst load threshold BL_TH 344. In one example, the scaling factor K 392 is less than one. MUX 350 is coupled to receive the load signal CMP 336 at its "0" input, the scaled burst load threshold BL_TH 344 at its "1" input, and the light load select signal LL_SEL 346 from the multi zone burst control 342 at its control input. In operation, MUX 350 outputs either the load signal CMP 336 or the scaled burst load threshold BL_TH 344 in response to the light load select signal LL_SEL 346. In the example shown, MUX 350 outputs the load signal CMP 336 when the light load select signal LL_SEL 346 is logic low and outputs the scaled burst load threshold BL_TH 344 when the light load select signal LL_SEL 346 is logic high.

Reference generator 351 is coupled to receive the output of MUX 350 and generate a first 390 and second 391 references for comparators 352 and 331 respectively. The first reference 390 may substantially follow the value of the load signal CMP 336. The second reference 391 may be a complementary version of the first reference 390, whereby the magnitude of the first reference 390 above a common-mode value is equal and opposite for the second reference 391, with respect to the same common-mode value. Thus two references are created, one which substantially follows the load signal CMP 336 and the other with a complementary reference as described. The two references may move in opposite directions with respect to the load. The first reference 390 may generally reduce in value with increasing load. The second reference 391 (the complementary reference) may therefore generally increase in value with respect to increasing load.

As shown in the depicted example, comparator 331 is coupled to receive the second reference 391 from the reference generator 351 at its inverting input and the power signal P 334 at its non-inverting input. Comparator 352 is coupled to receive the first reference 390 from the reference generator 351 at its non-inverting input and the power signal P 334 at its inverting input. Latch 332 is coupled to receive the outputs of comparators 331 and 352. In the example shown, the latch 332 receives the output of comparator 331 at its set S input and receives the output of comparator 352 at its reset R input. The output of the latch 332 is the switching frequency signal FSW 347. In operation, the latch 332 is set, and the switching frequency signal FSW 347 transitions to a logic high value, when the power signal P 334 is greater than the reference provided by the reference generator 351. The latch 332 is reset, and the switching frequency signal FSW 347 transitions to a logic low value, when the power signal P 334 falls below the reference provided by the reference generator 351. By varying the values of the two references output by the reference generator 351 in response to the load signal CMP 336 or the scaled burst load threshold BL_TH 344, the secondary controller 325 is able to control the switching frequency of the high side and low side switches and the amount of energy delivered to the output of the power converter.

As shown in the depicted example, multi zone burst control 342 includes a burst thresholds block 353, burst state machine 354, and burst timer 355. Burst thresholds block 353 is coupled to receive the feedback signal $U_{FB}$ 326 and may include several comparators, as will be shown in FIG. 3B, which compare the feedback signal $U_{FB}$ 326 to several thresholds. As shown, the burst thresholds block 353 outputs first, second, and third threshold signals: FB>VMAX 356, which is representative of whether the feedback signal $U_{FB}$ 326 has reached or is greater than a maximum value VMAX and may be logic high when asserted, FB<VMIN 357, which is representative of whether the feedback signal $U_{FB}$ 326 has reached or is less than a minimum value VMIN and may be logic high when asserted, and FB>VREG 358, which is representative of whether the feedback signal $U_{FB}$ 326 has reached or is greater than a regulation value VREG. The signals FB>VMAX 356 and FB<VMIN 357 are output to the burst state machine while the signal FB>VREG 358 is output to both the burst state machine 354 and burst timer 355.

Burst timer 355 is coupled to receive the burst on signal BURST_ON 348, the burst off signal BURST_OFF 349, and FB>VREG 358 and includes timers/counters and comparators to determine when the burst on period (i.e., the length of time when BURST_ON 348 is asserted) and burst off period (i.e., the length of time when BURST_OFF 349 is asserted) have reached one or more time thresholds. The burst timer 355 monitors the burst on signal BURST_ON 348, burst off signal BURST_OFF 349, and FB>VREG 358 to output first, second, third, and fourth timer signals: TD>T1 359, BOFF_EN 360, BON_SLL 361, and BOFF_SLL 362.

The signal TD>T1 359 is representative of whether the decay time TDECAY (length of time it takes for the feedback signal $U_{FB}$ 326 to decrease from the regulation value VREG to the minimum value VMIN) is greater than threshold period T1. In one example, TD>T1 359 is asserted when the decay time TDECAY is greater than or equal to the threshold period T1. As will be discussed further, the burst timer 355 utilizes the burst off signal BURST_OFF 349 and FB>VREG 358 to generate TD>T1 359.

BOFF_EN 360 is representative of enabling the burst off period to begin (i.e., the burst off signal BURST_OFF 349 may be asserted). As will be further discussed, BOFF_EN 360 is representative of allowing the burst off signal BURST_OFF 349 to be asserted after a threshold period T2 373 has elapsed. During intermediate burst, the fixed burst period, TBURST, is substantially fixed to threshold period T2 373 and the burst off signal BURST_OFF 349 does not get asserted unless threshold period T2 373 has elapsed since the burst off signal BURST_OFF 349 was previously asserted.

BON_SLL 361 is representative of the burst on period during super light load burst. In other words, BON_SLL 361 is representative of whether the burst on period has reached a threshold period T4 375. During super light load burst, the burst on period is substantially fixed to threshold period T4 375.

BOFF_SLL 362 is representative of the burst off period during super light load burst. In other words, BOFF_SLL 362 is representative of whether the burst off period has reached a threshold period T3 374. During super light load burst, the burst off period is substantially fixed to threshold period T3 374.

Burst state machine 354 is coupled to receive the burst enable signal BU_EN 345, the signals output by the burst threshold block 353, FB>VMAX 356, FB<VMIN 357, and FB>VREG 358, and the signals output by burst timer 355, TD>T1 359, BOFF_EN 360, BON_SLL 361, and BOFF_SLL 362, and output the light select signal LL_SEL 346, the burst on signal BURST_ON 348, and the burst off signal BURST_OFF 349. Although not shown, a debounce timer may be coupled between the burst state machine 354 and comparator 341. In operation, the debounce timer confirms that the output of comparator 341 is stable before forwarding the burst enable signal BU_EN 345 to the burst state machine 354. The debounce time may be substantially 200 µs. Optionally, a multi-valued or hysteretic debounce time could be used. The multi-valued debounce time could prevent erroneous state transitions, in particular for large values for the output capacitor CO 119. In one example, burst state machine 354 includes logic, which when executed generates light load select signal LL_SEL 346 to which MUX 350 selects its input. In addition, burst state machine 354 also controls which burst mode the secondary controller operates in as well as determines the lengths of time to assert either the burst on signal BURST_ON 348 and burst off signal BURST_OFF 349. When the burst enable signal BU_EN 345 is not asserted, the burst state machine 354 is operating in full frequency mode. As such, burst on signal BURST_ON 348 is asserted and BURST_OFF 349 is not asserted.

Figure 3B:
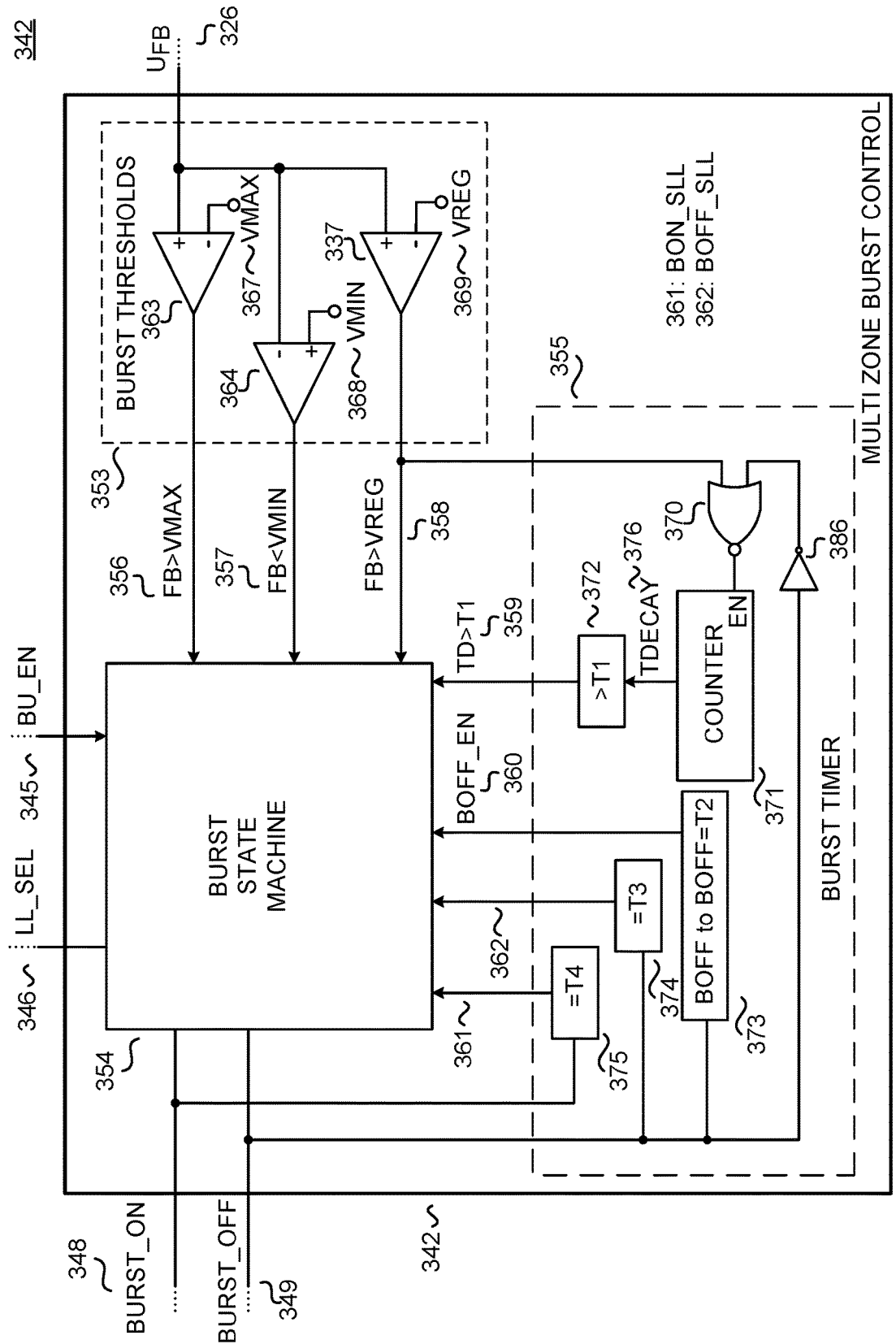
FIG. 3B is an example functional block diagram of the example multi zone burst control of FIG. 3A in accordance with the teachings of the present invention.

FIG. 3B is an example functional block diagram of the example multi zone burst control 342 in accordance with the teachings of the present invention. It is appreciated that multi zone burst control 342 of FIG. 3B may be one example of multi zone burst control 342 of FIG. 3A, and that similarly named or numbered elements are coupled and function as described above. As shown in the example depicted in FIG. 3B, multi zone burst control 342 includes burst thresholds block 353, burst timer 355, and burst state machine 354. Burst thresholds block 353 is shown as including comparators 363, 364, and 337. Comparator 363 is coupled to receive the feedback signal $U_{FB}$ 326 at its non-inverting input and maximum value VMAX 367 at its inverting input. The output of comparator 363 is the signal FB>VMAX 356. The signal FB>VMAX 356 is a rectangular pulse waveform with varying lengths of logic high and logic low sections. In operation, FB>VMAX 356 is logic high or pulses to a logic high value when the feedback signal $U_{FB}$ 326 has reached or is greater than the maximum value VMAX 367. FB>VMAX 356 is output to burst state machine 354.

Comparator 364 is coupled to receive the feedback signal $U_{FB}$ 326 at its inverting input and the minimum value VMIN 368 at its non-inverting input and outputs the signal FB<VMIN 357. The signal FB<VMIN 357 is a rectangular pulse waveform with varying lengths of logic high and logic low sections. In operation, FB<VMIN 357 is logic high or pulses to a logic high value when the feedback signal $U_{FB}$ 326 has reached or is less than the minimum value VMIN 368. FB<VMIN 357 is output to burst state machine 354.

Comparator 337 is coupled to receive the feedback signal $U_{FB}$ 326 at its non-inverting input and regulation value VREG 369 at its inverting input and outputs FB>VREG 358. The signal FB>VREG 358 is a rectangular pulse waveform with varying lengths of logic high and logic low sections. In operation, FB>VREG 358 is logic high or pulses to a logic high value when the feedback signal $U_{FB}$ 326 has reached or is greater than the regulation value VREG 369. FB>VREG 358 is output to burst state machine 354 and burst timer 355. Although not shown, the burst threshold block 353 could include another comparator which compares the feedback signal $U_{FB}$ 326 with a safety voltage which is greater than the VMAX 367. If the feedback signal $U_{FB}$ 326 reaches the safety voltage, the burst state machine 354 immediately asserts the burst off signal BURST_OFF 349.

Burst timer 355 is coupled to receive the burst on signal BURST_ON 348 and burst off signal BURST_OFF 349. Burst timer includes and utilizes inverter 386, logic NOR gate 370, counter 371 and comparator 372 to output the TD>T1 359 signal, which indicates that the decay time is greater than threshold period T1. As shown, the inverter 386 is coupled to receive burst off signal BURST_OFF 349. Inverter 385 inverts the burst off signal BURST_OFF 349 and provides the inverted burst off signal to one input of logic NOR gate 370. Another input of logic NOR gate 370 is coupled to receive FB>VREG 358. The output of logic NOR gate 370 is received at the enable input of counter 371. The output of counter 371 is the decay time TDECAY 376. In operation, the counter 371, logic NOR gate 370, and inverter 386 are utilized to measure the decay time TDECAY 376, which is the length of time for the feedback signal $U_{FB}$ 326 to decrease from the regulation value VREG 369 to the minimum value VMIN 368. In operation, output of logic NOR gate 370 is logic high when BURST_OFF 349 is not asserted and FB>VREG 358 is logic low (i.e., the feedback signal $U_{FB}$ 326 is less than the regulation value VREG 369). The internal count of counter 371 increases when enabled by the logic NOR gate 370 to provide the decay time TDECAY 376. At comparator 372, the decay time TDECAY 376 is compared to threshold period T1. Once the decay time TDECAY 376 is greater than or equal to threshold period T1, the signal TD>T1 359 is asserted. It should be appreciated that some hysteresis may be applied for comparing the decay time TDECAY 376 with the threshold period T1.

Block 373 is coupled to receive the burst off signal BURST_OFF 349 and compares the time since the burst off period began (i.e., the leading edge of BURST_OFF 349) with the threshold period T2. When the threshold period T2 has elapsed after the start of the burst off period, the BOFF_EN 360 signal is asserted. BOFF_EN 360 is representative of enabling the burst off period to begin (i.e., the burst off signal BURST_OFF 349 may be asserted).

Block 374 is coupled to receive the burst off signal BURST_OFF 349 and compares the burst off period with the threshold period T3. When the burst off period has reached the threshold period T3, the BOFF_SLL 362 signal is asserted.

Block 375 is coupled to receive the burst on signal BURST_ON 348 and compares the burst on period (i.e., when BURST_ON 348 is logic high) with threshold period T4. When the burst on period is greater than the threshold period T4, the BON_SLL 361 signal is asserted.

Figure 4:
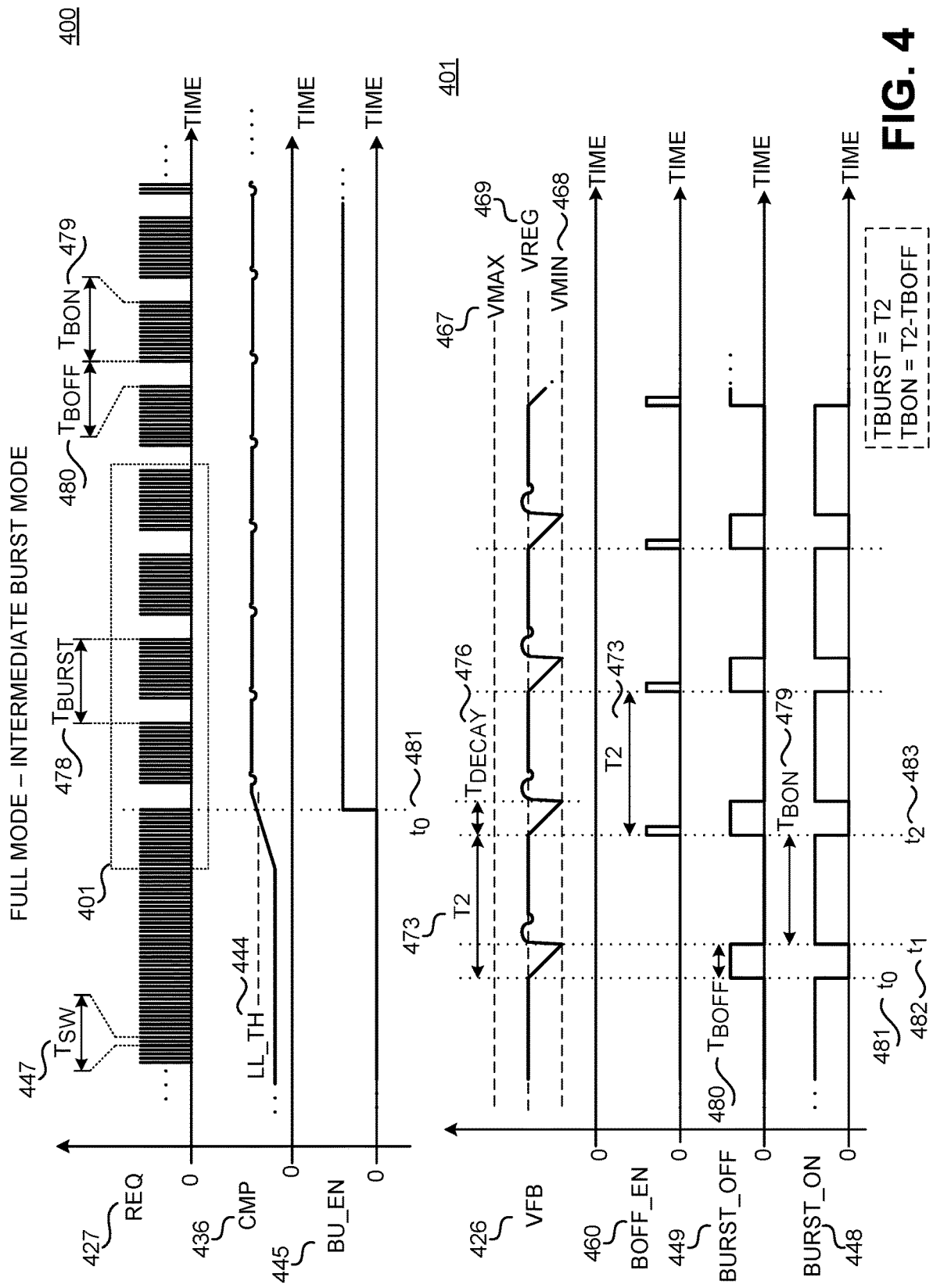
FIG. 4 shows example timing diagrams illustrating the transition between full mode and intermediate burst mode in accordance with the teachings of the present invention.

FIG. 4 shows example timing diagrams 400 and 401 illustrating the transition from full mode to intermediate burst mode in accordance with the teachings of the present invention. As shown in the depicted example, timing diagram 400 illustrates the request signal REQ 427, load signal CMP 436, and the burst enable signal BU_EN 445. The request signal REQ 427 shows a series of pulses. The time between leading edges of every other pulse, or in another example trailing edges of every other pulse, is substantially the switching period TSW 447, which is the inverse of the switching frequency signal FSW. Prior to time t0 481, the load signal CMP 436 is less than the burst load threshold BL_TH 444 and the burst enable signal BU_EN 445 is logic low. The secondary controller is operating at full mode and the switching period TSW 447 is responsive the value of the load signal CMP 436.

As shown in the example depicted in diagram 400 at time t0 481, the load signal CMP 436 increases above the burst load threshold BL_TH 444 and the burst enable signal BU_EN 445 transitions to a logic high value. For the example shown, a delay is not illustrated between the load signal CMP 436 increasing above the burst load threshold BL_TH 444 and the burst enable signal BU_EN 445 being asserted. However, it should be appreciated that a debounce timer could be utilized and as a such a delay (also referred to as a debounce time) would be present between the load signal CMP 436 increasing above the burst load threshold BL_TH 444 and the burst enable signal BU_EN 445 being asserted. Optionally, a multi-valued or hysteretic debounce time could be used. The multi-valued debounce time could prevent erroneous state transitions, in particular for large values for the output capacitor CO 119. As such, the multi zone burst control is enabled and the secondary controller begins operating in intermediate burst. As shown, the burst off period TBOFF 480 is the length of time with no switching, as indicated with no pulses shown in request signal REQ 427, while the burst on period TBON 479 is the length of time with switching, as indicated with pulses shown in request signal REQ 427. The burst period TBURST 478 is substantially the sum of the burst on period TBON 479 and the burst off period TBOFF 480. Or in other words, the burst period TBURST 478 is the period of the envelope of switching of the request signal REQ 427.

The portion of diagram 400 that is identified within the dashed line rectangle with the label 401 is illustrated in increased detail in diagram 401 of FIG. 4, which illustrates the feedback signal VFB 426, which is shown as a voltage signal, BOFF_EN signal 460, burst on signal BURST_ON 448, and burst off signal BURST_OFF 449. As shown in diagram 401 prior to time t0 481, the feedback signal VFB 426 is substantially regulated to the regulation value VREG 469. At time t0 481, the secondary controller operates in intermediate burst and the feedback signal VFB 426 may vary between the regulation value VREG 469 and the minimum value VMIN 468. Once intermediate burst is enabled at time t0 481, the burst off signal BURST_OFF 449 transitions to a logic high value and the burst on signal BURST_ON 448 transitions to a logic low value and the primary switches of the power converter are prevented from switching. As shown, the logic high section for BURST_OFF 449 is substantially the burst off period TBOFF 480 and the logic high section for BURST_ON 448 is substantially the burst on period TBON 479. The burst period TBURST 478 is substantially the time between consecutive leading edges, or consecutive trailing edges, for either the BURST_ON 448 or BURST_OFF 449 signals.

Between time t0 481 and time t1 482, which is the burst off period TBOFF 480 in diagram 401, the primary switches are not switching and the feedback voltage VFB 426 decreases from the regulation value VREG 469. Once the feedback voltage VFB 426 reaches the minimum value VMIN 468 at time t1 482, the burst on signal BURST_ON 448 transitions to a logic high value and BURST_OFF 449 transitions to a logic low value, which begins the burst on period TBON 479. As such, the primary switches are allowed to switch. During intermediate burst, the primary side switches are switched ON and OFF at a switching frequency set by the load signal CMP 436 to substantially regulate the feedback voltage VFB 426 to the regulation value VREG 469.

During intermediate burst, the burst period TBURST is substantially fixed to at least period T2 473. In other words, the burst off signal BURST_OFF 449 transitions to a logic high value substantially a period T2 473 after the previous logic high transition. As shown, the BOFF_EN signal 460 pulses to a logic high value at time t2 483, which is approximate to a period T2 473 elapsing since the previous leading edge in the BURST_OFF signal 449. If the secondary controller continues to operate in intermediate burst mode, the BOFF_EN signal 460 pulses to a logic high value every period T2 473 (or longer under certain conditions), which is the time between consecutive leading edges and is substantially equal to period T2 473.

Figure 5:
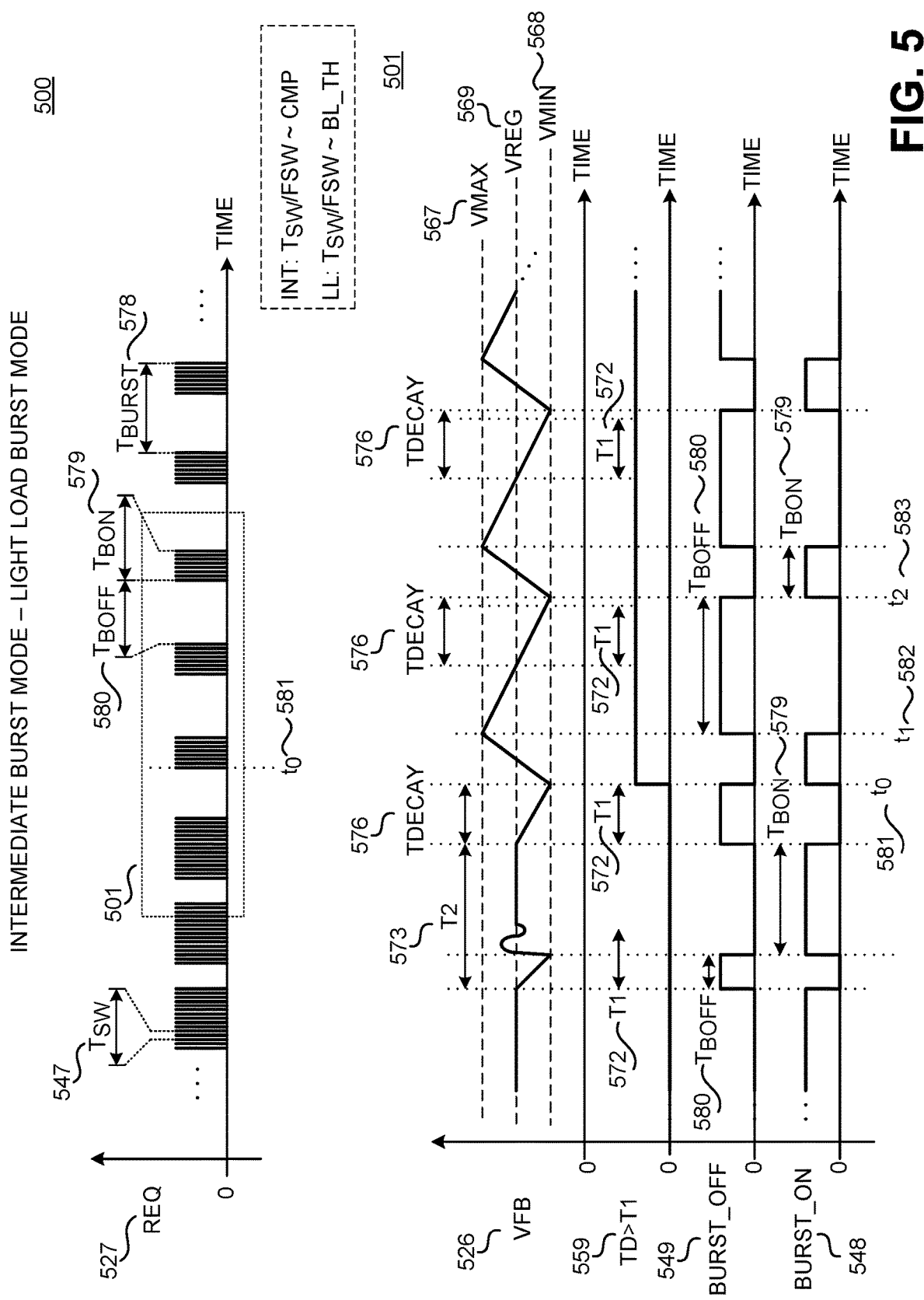
FIG. 5 shows example timing diagrams illustrating the transition between intermediate burst mode and light load burst mode in accordance with the teachings of the present invention.

FIG. 5 shows example timing diagrams 500 and 501 illustrating the transition between intermediate burst mode and light load burst mode in accordance with the teachings of the present invention. As shown in the depicted example, timing diagram 500 illustrates the request signal REQ 527. Similar to FIG. 4, the switching period TSW 547 is the time between leading edges of every other, or trailing edges of every other pulse. The burst off period TBOFF 580 is the length of time with no switching, which is indicated in diagram 500 with no pulses shown in request signal REQ 527, while the burst on period TBON 579 is the length of time with switching, which is indicated in diagram 500 with pulses shown in request signal REQ 527. The burst period TBURST 578 is substantially the sum of the burst on period TBON 579 and the burst off period TBOFF 580. Or in other words, the burst period TBURST 578 is the period of the envelope of switching of the request signal REQ 527. The load signal CMP and the burst enable signal BU_EN are not illustrated since the burst enable signal BU_EN is logic high once the secondary controller is operating in intermediate burst. In the example shown, time t0 581 is when the transition between intermediate burst and light load burst occurs.

The portion of diagram 500 that is identified within the dashed line rectangle with the label 501 is illustrated in increased detail in diagram 501 of FIG. 5, which illustrates the feedback signal VFB 526, which is shown as a voltage signal, TD>T1 signal 559, burst on signal BURST_ON 548 and burst off signal BURST_OFF 549 are illustrated in the diagram 501 below diagram 500 in FIG. 5. Prior to time t0 581, the timing and characteristics of the feedback signal VFB 526, BURST_OFF signal 549 and BURST_ON signal 548 are as discussed with respect to FIG. 4. For example, the burst period TBURST prior to time t0 581 is substantially equal to period T2. As previously discussed, a decay time TDECAY 576 is the length of time for the feedback voltage VFB 526 to decrease from the regulation value VREG 569 to the minimum value VMIN 568. During intermediate burst, the decay time TDECAY 576 is substantially equal to the burst off period TBOFF 580. However, as the load decreases, the decay time TDECAY 576 lengthens. Once the decay time TDECAY 576 lengthens to the point that it reaches the threshold period T1 572, the secondary controller begins operating in light load burst mode. The signal TD>T1 559 is representative of whether the decay time TDECAY 576 has reached the threshold period T1 572.

Prior to time t0 581, the decay time TDECAY 576 is less than the period threshold T1 527. At time t0 581, the decay time TDECAY 576, which is the burst off period TBOFF 580, reaches the period threshold T1 527 and the signal TD>T1 559 transitions to a logic high value. At this time, the secondary controller is operating in light load burst. The burst off signal BURST_OFF 549 transitions to a logic low value and the burst on signal BURST_ON 548 transitions to a logic high value and the primary switches are allowed to switch ON and OFF.

During light load burst, the feedback voltage VFB 526 varies between the minimum value VMIN 568 and the maximum value VMAX 567. Between time t0 581 and time t1 583, the BURST_ON 548 is logic high, the primary switches are switching, and the feedback voltage VFB 526 increases from the minimum value VMIN 568. Once the feedback voltage VFB 526 reaches the maximum value VMAX 567 at time t1 583, the burst on signal BURST_ON 548 transitions to a logic low value and the burst on period TBON 579 ends. The burst off signal BURST_OFF 549 transitions to a logic high value, the burst off period TBOFF 580 begins, and the primary side switches are prevented from switching. Between time t1 582 and time t2 583, the feedback voltage VFB 526 decreases from the maximum value VMAX 567 to the minimum value VMIN 568. At time t2 582, the feedback voltage VFB 526 reaches the minimum value VMIN 568 and the burst off signal BURST_OFF 549 transitions to a logic low value and the burst off period TBOFF 580 ends. The burst on signal BURST_ON 548 transitions to a logic high value, the next burst on period TBON 579 begins, and the feedback voltage VFB 526 subsequently begins to increase.

During light load burst, the burst off period TBOFF 580 is substantially the length of time for the feedback voltage VFB 526 to decrease from the maximum value VMAX 567 to the minimum value VMIN 568 while the burst on period TBON 579 is substantially the length of time for the feedback voltage VFB 526 to increase from the minimum value VMIN 568 to the maximum value VMAX 567. The burst period TBURST 578 is variable and is substantially the sum of the burst on period TBON 579 and the burst off period TBOFF 580. Further, during intermediate burst, the switching period TSW of the pulses of the request signal REQ 527 is responsive to the load signal CMP. However during light load burst, the switching period TSW of the pulses of the request signal REQ 527 is responsive to the burst load threshold BL_TH or a scaled version of it. For the example shown, the secondary controller remains in light load burst if the decay time TDECAY 576 is greater than the threshold period T1 572.

Figure 6:
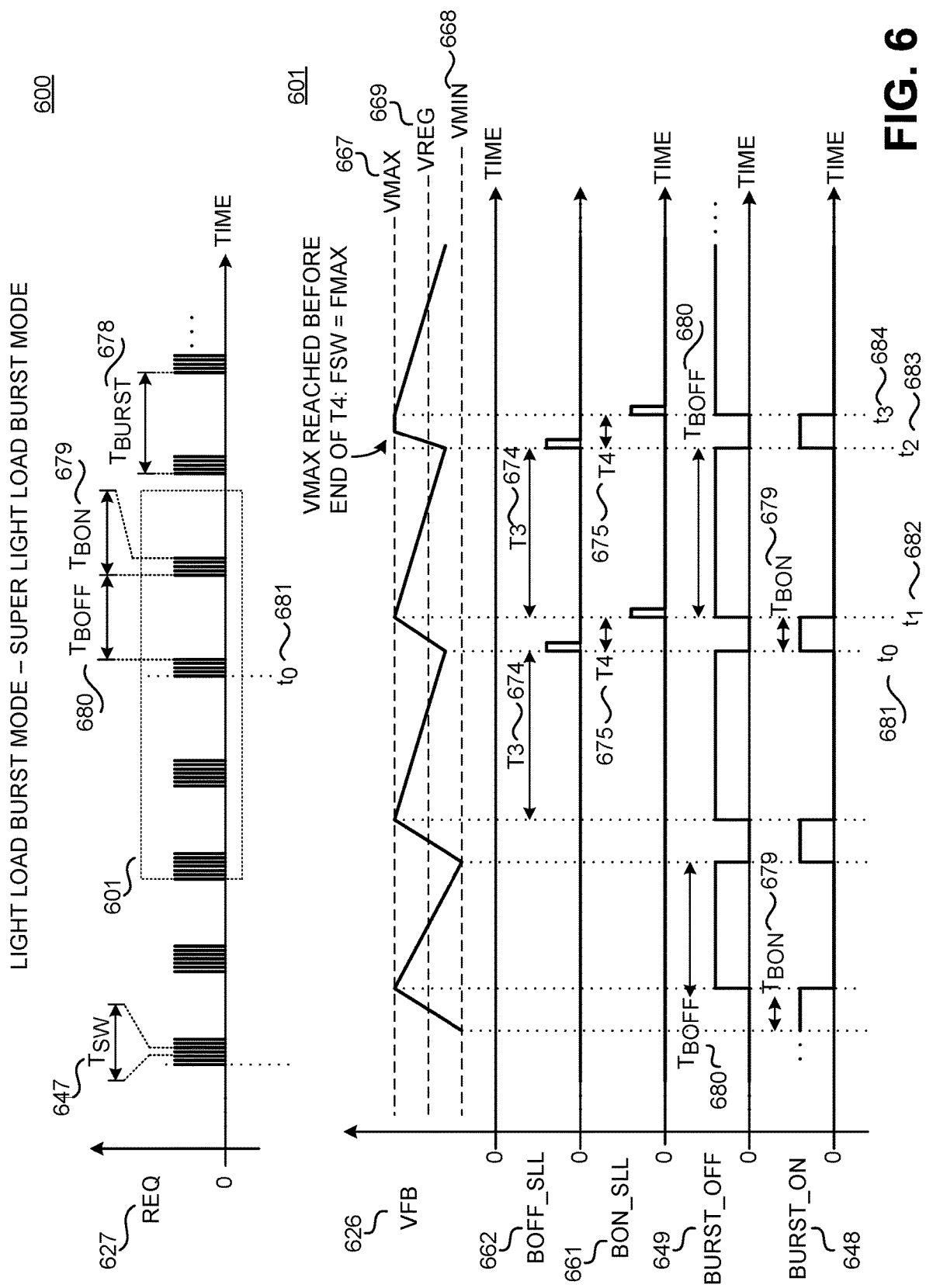
FIG. 6 shows example timing diagrams illustrating the transition between light load burst mode and super light load burst mode in accordance with the teachings of the present invention.

FIG. 6 shows example timing diagram 600 and 601 illustrating the transition between light load burst mode and super light load burst mode in accordance with the teachings of the present invention. As shown, timing diagram 600 illustrates the request signal REQ 627. Similar to FIGS. 4 and 5, the switching period TSW 647 is the time between leading edges, or trailing edges, of every other pulse. The burst off period TBOFF 680 is the length of time with no switching, which is indicated with no pulses shown in request signal REQ 627, while the burst on period TBON 679 is the length of time with switching, which is indicated with pulses shown in request signal REQ 627. The burst period TBURST 678 is substantially the sum of the burst on period TBON 679 and the burst off period TBOFF 680. Or in other words, the burst period TBURST 678 is the period of the envelope of switching of the request signal REQ 627. In the example shown, time t0 681 is when the transition between light load burst and super light load burst occurs.

The portion of diagram 600 that is identified within the dashed line rectangle with the label 601 is illustrated in increased detail in diagram 601 of FIG. 6, which illustrates the feedback signal VFB 626, which is shown as a voltage signal, BOFF_SLL signal 662, BON_SLL signal 661, burst on signal BURST_ON 648 and burst off signal BURST_OFF 649 are shown in the timing diagram 601 below diagram 600 in FIG. 6. Prior to time t0 681, the timing and characteristics of the feedback signal VFB 626, the BURST_OFF signal 649 and BURST_ON signal 648 are as discussed with respect to FIG. 5. For example, the burst period TBURST prior to time t0 681 is substantially the length of time for the feedback voltage VFB 626 to increase to the maximum value VMAX 667 and then decrease to the minimum value VMIN 668. Or in other words, the burst on period TBON 679 is substantially the length of time to increase from VMIN 668 to VMAX 667 and the burst off period TBOFF 680 is substantially the length of time to decrease from VMAX 667 to VMIN 6687. However, as the load decreases, the time for the feedback voltage VFB 626 to decrease from the maximum value VMAX 667 to the minimum value VMIN 668 lengthens. As such, the burst off period TBOFF 680 also lengthens. Once the burst off period TBOFF 680 lengthens to the point that it reaches the threshold period T3 674, the secondary controller begins operating in super light load burst mode. The signal BOFF_SLL 662 is representative of whether the burst off period TBOFF 680 has reached the threshold period T3 674.

Prior to time t0 681, the burst off period TBOFF 680 is less than the threshold period T3 674. At time t0 681, the burst off period TBOFF 680 reaches the threshold period T3 674 and the signal BOFF_SLL 662 pulses to a logic high value. The burst off signal BURST_OFF 649 transitions to a logic low value and the burst off period TBOFF 680 ends. The burst on signal BURST_ON 648 transitions to a logic high value, the burst on period TBON 679 begins, and the primary side switches are allowed to switch.

During super light load burst mode, the burst period TBURST 678, the burst on period TBON 679, and the burst off period TBOFF 680 are substantially fixed. The burst on period TBON 679 is substantially fixed to threshold period T4 675 while the burst off period TBOFF 680 is substantially fixed to threshold period T3 674. Between time t0 681 and time t1 682, BURST_ON 648 is logic high, the primary side switches are allowed to switch, and the feedback signal VFB 626 increases to the maximum value VMAX 667. At time t1 682, a threshold period T4 has elapsed from the start of the burst on period TBON 679 (i.e., a threshold period T4 675 elapses from the previous leading edge of the burst on signal BURST_ON 648) and the BON_SLL signal 662 pulses to a logic high value. The burst on signal BURST_ON 648 transitions to a logic low value and the burst on period TBON 679 ends. Burst off signal BURST_OFF 649 transitions to a logic high value and the burst off period TBOFF 680 begins.

Between time t1 682 and time t2 683, BURST_OFF 649 is logic high and the primary side switches are prevented from switching. As shown, the feedback voltage VFB 626 decrease from the maximum value VMAX 667. At time t2 683, the threshold period T3 674 has elapsed from the start of the burst off period TBOFF 680 (i.e. threshold period T3 674 has elapsed from the previous leading edge of the burst off signal BURST_OFF 649) and BOFF_SLL 662 pulses to a logic high value. The burst off signal BURST_OFF 649 transitions to a logic low value and the burst off period TBOFF 680 ends. Burst on signal BURST_ON 648 transitions to a logic high value, the burst on period TBON 679 begins and the primary switches are allowed to switch on and off. As long as the secondary controller operates in super light load burst, a pulse will be seen every threshold period T3 674 in the BOFF_SLL signal 662 and every threshold period T4 675 in BON_SLL signal 661. At time t3 684, the feedback voltage VFB 626 reaches the maximum value VMAX 667 prior to the end of threshold period T4 675. If the maximum value VMAX 667 is reached prior to the end of the threshold period T4 675, the switching frequency signal FSW of pulses for pulses of the request signal REQ 627 is set to the maximum switching frequency FMAX (i.e. the switching period TSW is set to the minimum switching period TMIN) or to another suitably high frequency in which no power is delivered to the output. It should be appreciated that the operation at maximum switching frequency FMAX may be optional. In another example, if the maximum value VMAX 667 is reached prior to the end of the threshold period T4 675, the burst on period TBON 679 is terminated.

Figure 7:
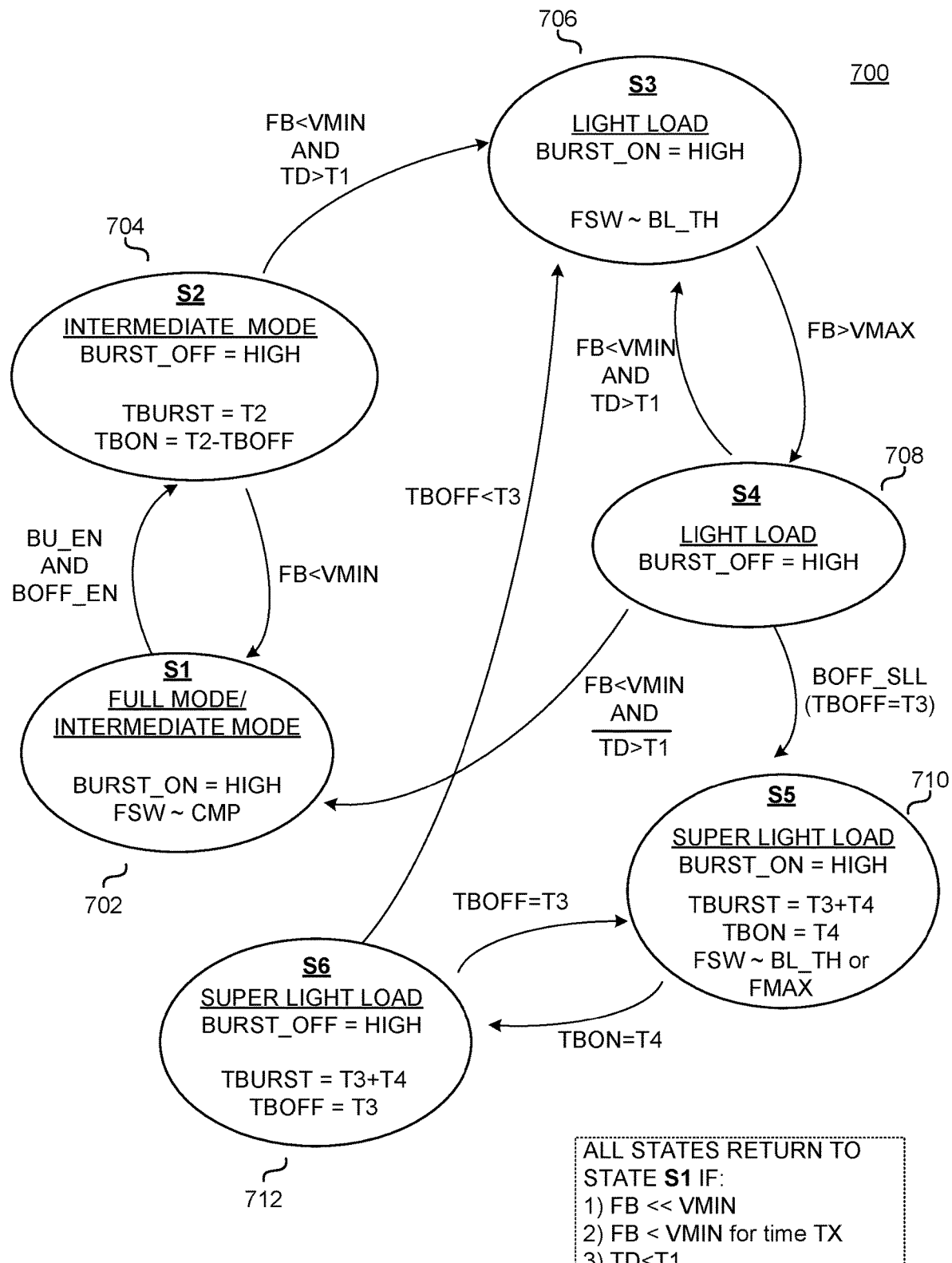
FIG. 7 shows generally a state machine diagram of one example of a state machine including logic, which when executed implements a burst state machine with multi zone burst control in accordance with the teachings of the present invention.

FIG. 7 shows generally a state machine diagram 700 of one example of a state machine including logic, which when executed implements a burst state machine with multi zone burst control as described in the examples above in accordance with the teachings of the present invention. For instance, it is noted that state machine diagram 700 of FIG. 7 may be one example of an implementation of burst state machine 354 of FIG. 3, and that similarly named and numbered elements referenced below are coupled and function similar to as described above.

As will be shown, the state machine diagram 700 illustrates the transitions among the various burst mode states S1 702 through S6 712 of one example of a burst state machine included in a secondary controller in accordance with the teachings of the present invention. In one example, the state machine starts operation in state S1 702, which is labeled full mode/intermediate mode in FIG. 7. While in state S1 702, the secondary controller is operating in full mode/intermediate burst mode, the burst on signal BURST_ON signal is asserted or logic high, and the switching frequency signal FSW is responsive to the value of the load signal CMP. It is appreciated that all other states S2 704 through state S6 712 transition back to full mode in state S1 702 if the feedback signal is much less than the minimum value VMIN, if the feedback signal is less than the minimum value VMIN for too long (i.e., time TX), or if the decay time is too short (i.e., TD<T1), which are indicative of a high load condition. In addition, when the output capacitor CO is large enough such that the decay time $T_{DECAY}$ may not be a good indicator of load condition, the burst state machine may utilize the feedback signal VFB to exit states. The burst state machine transitions from state S1 702 to state S2 704 if the burst enable signal BU_EN is asserted or logic high, and when the burst off enable period is enabled with the BOFF_EN signal.

When operating in state S2 704, the secondary controller is operating in intermediate burst mode, the burst off signal BURST_OFF signal is asserted or logic high. The burst period TBURST is substantially fixed to the threshold period T2, and the burst on period TBON is substantially equal the difference between the threshold period T2 and the burst off period TBOFF. As mentioned previously, the burst state machine transitions from state S2 704 back to state S1 702 when the FB<VMIN signal is asserted or logic high, which indicates that the feedback signal $U_{FB}$ has reached or is less than the minimum value VMIN. The burst state machine transitions from state S2 704 to state S3 706 if the TD>T1 signal is asserted or logic high, which indicates that the decay time TDECAY (i.e., the length of time it takes for the feedback signal $U_{FB}$ to decrease from the regulation value VREG to the minimum value VMIN) is greater than threshold period T1 and the feedback signal is less than the minimum value VMIN.

When operating in state S3 706, the secondary controller is operating in light load burst mode, the burst on signal BURST_ON signal is asserted or logic high, and the switching frequency signal FSW is responsive to the burst load threshold BL_TH. The burst state machine transitions from state S3 706 to state S4 708 if the FB>VMAX signal is asserted or is a logic high, which indicates that the feedback signal $U_{FB}$ has reached or is greater than the maximum value VMAX.

When operating in state S4 708, the secondary controller is operating in light load burst mode and the burst off signal BURST_OFF signal is asserted or logic high. The burst state machine transitions from state S4 708 back to state S3 706 if the FB<VMIN signal is asserted or is logic high, which indicates that the feedback signal $U_{FB}$ has reached or is less than the minimum value VMIN and if the TD>T1 signal is asserted. The burst state machine transitions from state S4 708 back to state S1 702 if the TD>T1 signal is deasserted or logic low, which indicates that the decay time TDECAY (i.e., the length of time it takes for the feedback signal $U_{FB}$ to decrease from the regulation value VREG to the minimum value VMIN) is no longer greater than threshold period T1 and the FB<VMIN is asserted. The burst state machine transitions from state S4 708 to state S5 710 if the BOFF_SLL signal is asserted or logic high, which indicates that the burst off period TBOFF has reached the threshold period T3.

When operating in state S5 710, the secondary controller is operating in super light load burst mode, the burst on signal BURST_ON signal is asserted or logic high, and the burst period TBURST is substantially fixed to the sum of the threshold period T3 and the threshold period T4, where the burst on period TBON is substantially fixed at the threshold period T4. In addition, when operating in super light load burst mode, the switching frequency signal FSW 247 is substantially equal to BL_TH (in other words, the switching frequency signal FSW 247 is responsive to the burst load threshold BL_TH), or under certain conditions the switching frequency signal FSW 247 may increase to the maximum switching frequency FMAX such that the switching frequency signal FSW in super light load burst mode of state S5 710 toggles between BL_TH and FMAX. The burst state machine transitions from state S5 710 to state S6 712 if the threshold period T4 has elapsed from the start of the burst on period TBON (i.e., a threshold period T4 has elapsed from the previous leading edge of the burst on signal BURST_ON).

When operating in state S6 712, the secondary controller is operating in super light load burst mode, the burst off signal BURST_OFF signal is asserted or logic high, and the fixed burst period TBURST is substantially the sum of the threshold period T3 and the threshold period T4, where the burst off period TBOFF is substantially fixed at the threshold period T3. The burst state machine transitions from state S6 712 back to state S5 710 if the burst off period TBOFF has reached the threshold period T3. The burst state machine transitions from state S6 712 to state S3 706 if the burst off period TBOFF falls below the threshold period T3.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

Although the present invention is defined in the claims, it should be understood that the present invention can alternatively be defined in accordance with the following examples:

Example 1. A controller for use in a power converter, comprising: a control loop clock generator coupled to generate a switching frequency signal in response to a burst load threshold, a power signal, and a load signal responsive to an output load of the power converter, a switching frequency of the switching frequency signal is above a mechanical audio resonance range of an energy transfer element of the power converter and above an audible noise frequency; a burst control circuit coupled to generate a burst on signal, and a burst off signal in response to a feedback signal representative of an output of the power converter and a burst enable signal responsive to the burst load threshold and the load signal to operate the controller in a plurality of burst modes, wherein a burst frequency of the burst on signal or the burst off signal is less than the mechanical audio resonance range of the energy transfer element of the power converter; and a request transmitter circuit coupled to generate a request signal in response to the switching frequency signal, the burst on signal, and the burst off signal to control switching of a switching circuit coupled to the energy transfer element and an input of the power converter.

Example 2. The controller of example 1, further comprising: a burst load threshold circuit coupled to generate the burst load threshold in response to an input voltage signal representative of an input voltage of the power converter; and a first comparator coupled to generate the burst enable signal in response to a comparison of the burst load threshold and the load signal.

Example 3. The controller of example 1 or 2, wherein the input voltage signal and the power signal are combined into a single signal sensed from a primary winding of the energy transfer element.

Example 4. The controller of any one of examples 1 to 3, wherein the power signal is representative of one or more of a sensed output power of the power converter, power delivered by the energy transfer element, input power of the power converter, or power processed by the power converter.

Example 5. The controller of any one of examples 1 to 4, further comprising a transconductance amplifier having a first input coupled to receive the feedback signal, a second input coupled to receive a reference signal, and an output coupled to a compensation circuit coupled to an output return of the power converter, wherein the transconductance amplifier is coupled to generate the load signal in response to the feedback signal, the reference signal, and the compensation circuit.

Example 6. The controller of any one of examples 1 to 5, wherein the control loop clock generator comprises a multiplexor having a first input coupled to receive the load signal, a second input coupled to receive the burst load threshold, and a select input coupled to receive a light load select signal; a reference generator coupled to an output of the multiplexor to generate a first clock reference signal and a second clock reference signal; a second comparator coupled to compare the first clock reference and the power signal; a third comparator coupled to compare the second clock reference and the power signal; and a latch having a reset input coupled to an output of the second comparator and a set input coupled to an output of the third comparator, wherein an output of the latch is coupled to generate the switching frequency signal.

Example 7. The controller of any one of examples 1 to 6, wherein the burst control circuit comprises a burst thresholds circuit coupled to generate a first threshold signal, a second threshold signal, and a third threshold signal in response to the feedback signal; a burst timer circuit coupled to generate a first timer signal, a second timer signal, a third timer signal, and a fourth timer signal in response to the third threshold signal, the burst on signal, and the burst off signal; and a burst state machine coupled to generate the burst on signal, the burst off signal, and a light load select signal in response to the burst enable signal, the first threshold signal, the second threshold signal, the third threshold signal, the first timer signal, the second timer signal, the third timer signal, and the fourth timer signal.

Example 8. The controller of any one of examples 1 to 7, wherein the burst thresholds circuit comprises a fourth comparator coupled to generate the first threshold signal in response to a comparison of the feedback signal and a maximum value signal; a fifth comparator coupled to generate the second threshold signal in response to a comparison of the feedback signal and a minimum value signal; and a sixth comparator coupled to generate the third threshold signal in response to a comparison of the feedback signal and a regulation value signal.

Example 9. The controller of any one of examples 1 to 8, wherein the burst timer circuit comprises a logic gate coupled to be responsive to the third threshold signal and the burst off signal; a counter having an enable input coupled to an output of the logic gate to generate a decay time signal; a seventh comparator coupled to generate the first timer signal in response to a comparison of the decay time signal and a first threshold period; an eighth comparator coupled to generate the second timer signal in response to a comparison of the burst off signal and a second threshold period; a ninth comparator coupled to generate the third timer signal in response to a comparison of the burst off signal and a third threshold period; and a tenth comparator coupled to generate the fourth timer signal in response to a comparison of the burst on signal and a fourth threshold period.

Example 10. The controller of any one of examples 1 to 9, wherein the burst state machine is coupled to operate in a plurality of states to operate the controller in the plurality of burst modes, wherein the plurality of burst modes includes a full mode, an intermediate burst mode, a light load burst mode, and a super light load burst mode.

Example 11. The controller of any one of examples 1 to 10, wherein burst state machine is coupled to operate in a first state to operate the controller in the full mode with the burst on signal asserted and with the switching frequency signal responsive to a value of the load signal.

Example 12. The controller of any one of examples 1 to 11, wherein the burst state machine is coupled to transition from the first state to a second state in response to the burst enable signal being asserted or in response to a comparison of the burst off signal and a second threshold period, wherein the burst state machine is coupled to operate in the second state to operate the controller in the intermediate burst mode with the burst off signal asserted, a fixed burst period substantially fixed to the second threshold period, and a burst on period is equal to a difference between the second threshold period and a burst off period.

Example 13. The controller of any one of examples 1 to 12, wherein the burst state machine is coupled to transition from all states back to the first state in response to the burst enable signal being deasserted or in response to a comparison of the feedback signal and a minimum value signal.

Example 14. The controller of any one of examples 1 to 13, wherein the burst state machine is coupled to transition from the second state to a third state in response to a comparison of a time decay signal and a first threshold period, wherein the burst state machine is coupled to operate in the third state to operate the controller in the light load burst mode with the burst on signal asserted and with the switching frequency signal responsive to a value of the burst load threshold.

Example 15. The controller of any one of examples 1 to 14, wherein the burst state machine is coupled to transition from the third state to a fourth state in response to a comparison of the feedback signal and a maximum value signal, wherein the burst state machine is coupled to operate in the fourth state to operate the controller in the light load burst mode with the burst off signal asserted, and wherein the burst state machine is coupled to transition from the fourth state back to the third state in response to a comparison of the feedback signal and a minimum value signal.

Example 16. The controller of claim any one of examples 1 to 15, wherein the burst state machine is coupled to transition from the fourth state to a fifth state in response to the burst off period reaching a third threshold period, wherein the burst state machine is coupled to operate in the fifth state to operate the controller in the super light load burst mode with the burst on signal asserted, the fixed burst period substantially fixed to a sum of the third threshold period and a fourth threshold period, and the switching frequency signal is substantially equal to either a fixed burst load threshold value or a maximum switching frequency.

Example 17. The controller of any one of examples 1 to 16, wherein the burst state machine is coupled to transition from the fifth state to a sixth state in response to the burst on period reaching the fourth threshold period, wherein the burst state machine is coupled to operate in the sixth state to operate the controller in the super light load burst mode with the burst off signal asserted, and the fixed burst period substantially fixed to the sum of the third threshold period and the fourth threshold period, wherein the burst state machine is coupled to transition from the sixth state back to the fifth state in response to the burst off period reaching a third threshold period, and wherein the burst state machine is coupled to transition from the sixth state back to the third state in response to the burst off period falling below the third threshold period.

Example 18. A power converter, comprising an energy transfer element coupled between an input of the power converter and an input of the power converter; a switching circuit coupled to energy transfer element and the input of the power converter; and a controller coupled to control switching of the switching circuit to control a transfer of energy from an input of the power converter to the output of the power converter, wherein the controller includes: a control loop clock generator coupled to generate a switching frequency signal in response to a burst load threshold, a power signal, and a load signal responsive to the output load of the power converter, a switching frequency of the switching frequency signal is greater than a mechanical audio resonance range of the energy transfer element and above an audible noise frequency; a burst control circuit coupled to generate a burst on signal, and a burst off signal in response to a feedback signal representative of the output of the power converter and a burst enable signal responsive to the burst load threshold and the load signal to operate the controller in a plurality of burst modes, wherein a burst frequency of the burst on signal or the burst off signal is less than the mechanical audio resonance range of the energy transfer element and less than an audible noise frequency; and a request transmitter circuit coupled to generate a request signal in response to the switching frequency signal, the burst on signal, and the burst off signal to control switching of the switching circuit.

Example 19. The power converter of example 18, wherein the power converter is a resonant converter, wherein the power converter further comprises a resonant tank circuit including a tank inductance coupled to a tank capacitance coupled to the switching circuit, wherein the switching circuit includes a high side switch and a low side switch coupled to the resonant tank circuit.

Example 20. The power converter of examples 18 or 19, wherein the controller is a secondary controller, wherein the power converter further comprises a primary controller galvanically isolated from the secondary controller, wherein the primary controller is coupled to receive the request signal from the secondary controller to generate a high side drive signal to control switching of the high side switch, and a low side drive signal to control switching of the low side switch.

Example 21. The power converter of any one of examples 18 to 20, wherein the controller further comprises: a burst load threshold circuit coupled to generate the burst load threshold in response to an input voltage signal representative of an input voltage of the power converter; and a first comparator coupled to generate the burst enable signal in response to a comparison of the burst load threshold and the load signal.

Example 22. The power converter of any one of examples 18 to 21, further comprising a compensation circuit coupled to an output return of the power converter, wherein the compensation circuit comprises: a resistor coupled to a first capacitor coupled between the output return of the power converter and the controller; and a second capacitor coupled in parallel across the resistor and the first capacitor.

Example 23. The power converter of any one of examples 18 to 22, wherein the controller further comprises a transconductance amplifier having a first input coupled to receive the feedback signal, a second input coupled to receive a reference signal, and an output coupled to the compensation circuit, wherein the transconductance amplifier is coupled to generate the load signal in response to the feedback signal, the reference signal, and the compensation circuit.

Example 24. The power converter of any one of examples 18 to 23, wherein the control loop clock generator comprises a multiplexor having a first input coupled to receive the load signal, a second input coupled to receive the burst load threshold, and a select input coupled to receive a light load select signal; a reference generator coupled to an output of the multiplexor to generate a first clock reference signal and a second clock reference signal; a second comparator coupled to compare the first clock reference and the power signal; a third comparator coupled to compare the second clock reference and the power signal; and a latch having a reset input coupled to an output of the second comparator and a set input coupled to an output of the third comparator, wherein an output of the latch is coupled to generate the switching frequency signal.

Example 25. The power converter of any one of examples 18 to 24, wherein the burst control circuit comprises: a burst thresholds circuit coupled to generate a first threshold signal, a second threshold signal, and a third threshold signal in response to the feedback signal; a burst timer circuit coupled to generate a first timer signal, a second timer signal, a third timer signal, and a fourth timer signal in response to the third threshold signal, the burst on signal, and the burst off signal; and a burst state machine coupled to generate the burst on signal, the burst off signal, and a light load select signal in response to the burst enable signal, the first threshold signal, the second threshold signal, the third threshold signal, the first timer signal, the second timer signal, the third timer signal, and the fourth timer signal.

Example 26. The power converter of any one of examples 18 to 25, wherein the burst thresholds circuit comprises a fourth comparator coupled to generate the first threshold signal in response to a comparison of the feedback signal and a maximum value signal; a fifth comparator coupled to generate the second threshold signal in response to a comparison of the feedback signal and a minimum value signal; and a sixth comparator coupled to generate the third threshold signal in response to a comparison of the feedback signal and a regulation value signal.

Example 27. The power converter of any one of examples 18 to 26, wherein the burst timer circuit comprises a logic gate coupled to be responsive to the third threshold signal and the burst off signal; a counter having an enable input coupled to an output of the logic gate to generate a decay time signal; a seventh comparator coupled to generate the first timer signal in response to a comparison of the decay time signal and a first threshold period; an eighth comparator coupled to generate the second timer signal in response to a comparison of the burst off signal and a second threshold period; a ninth comparator coupled to generate the third timer signal in response to a comparison of the burst off signal and a third threshold period; and a tenth comparator coupled to generate the fourth timer signal in response to a comparison of the burst on signal and a fourth threshold period.

Example 28. The power converter of any one of examples 18 to 27, wherein the burst state machine is coupled to operate the controller in the plurality of burst modes, wherein the plurality of burst modes includes a full mode, an intermediate burst mode, a light load burst mode, and a super light load burst mode.

Example 29. The power converter of any one of examples 18 to 28, wherein burst state machine is coupled to operate controller in the full mode with the burst on signal asserted and with the switching frequency signal responsive to a value of the load signal.

Example 30. The power converter of any one of examples 18 to 29, wherein the burst state machine is coupled to transition the controller from operating in the full mode to the controller operating in the intermediate burst mode in response to the burst enable signal being asserted or in response to a comparison of the burst off signal and a second threshold period.

Example 31. The power converter of any one of examples 18 to 30, wherein the burst state machine is coupled to transition the controller from operating in the intermediate burst mode, the light load burst mode, or the super light burst mode to operating in the full mode in response to the burst enable signal being deasserted or in response to a comparison of the feedback signal and a minimum value signal.

Example 32. The power converter of any one of examples 18 to 31, wherein the burst state machine is coupled to transition the controller from operating in the intermediate burst mode to the controller operating in the light load burst mode in response to a comparison of a time decay signal and a first threshold period.

Example 33. The power converter of any one of examples 18 to 32, wherein the burst state machine is coupled to transition the controller from operating in the light load burst mode to the controller operating in the super light load burst mode in response to the burst off period reaching a third threshold period.

Example 34. The power converter of any one of examples 18 to 33, wherein the burst state machine is coupled to transition the controller from operating in the super light load burst mode to the controller operating in the light load burst mode in response to the burst off period falling below the third threshold period.

Example 35. A method of controlling a power converter having a plurality of burst modes, comprising operating the power converter in a first state with a burst on signal asserted and with a switching frequency signal responsive to a value of a load signal; operating the power converter in a second state with a burst off signal asserted, a fixed burst period substantially fixed to a second threshold period, and a burst on period is equal to a difference between the second threshold period and a burst off period; operating the power converter in a third state with the burst on signal asserted and with the switching frequency signal responsive to a value of the burst load threshold; operating the power converter in a fourth state with the burst off signal asserted; operating the power converter in a fifth state with the burst on signal asserted, the fixed burst period substantially fixed to a sum of a third threshold period and a fourth threshold period, and the switching frequency signal is substantially equal to either a fixed burst load threshold value or a maximum switching frequency; and operating the power converter in a sixth state with the burst off signal asserted, and the fixed burst period substantially fixed to the sum of the third threshold period and the fourth threshold period.

Example 36. The method of example 35, further comprising transitioning back from the operating the power converter in the second state, the third state, the fourth state, the fifth state, or the sixth state to operating the power converter in the first state in response to a burst enable signal being deasserted or in response to a comparison of a feedback signal and a minimum value signal.

Example 37. The method of examples 35 or 36, further comprising transitioning from operating the power converter in the first state to operating the power converter in the second state in response to a burst enable signal being asserted or in response to a comparison of the burst off signal and the second threshold period.

Example 38. The method of any one of examples 35 to 37, further comprising transitioning from operating the power converter in the second state to operating the power converter in the third state in response to a comparison of a time decay signal and a first threshold period.

Example 39. The method of any one of examples 35 to 38, further comprising transitioning from operating the power converter in the third state to operating the power converter in the fourth state in response to a comparison of a feedback signal and a maximum value signal, and transitioning from operating the power converter in the fourth state back to operating the power converter in the third state in response to a comparison of the feedback signal and a minimum value signal.

Example 40. The method of any one of examples 35 to 39, further comprising transitioning from operating the power converter in the fourth state to operating the power converter in the fifth state in response to the burst off period reaching the third threshold period.

Example 41. The method of any one of examples 35 to 40, further comprising transitioning from operating the power converter in the fifth state to operating the power converter in the sixth state in response to the burst on period reaching the fourth threshold period, transitioning from operating the power converter in the sixth state back to operating the power converter in the fifth state in response to the burst off period reaching the third threshold period, and transitioning from operating the power converter in the sixth state back to the third state in response to the burst off period falling below the third threshold period.

Example 42. The method of any one of examples 35 to 41, wherein the plurality of burst modes comprises a full mode, an intermediate burst mode, a light load burst mode, and a super light load burst mode, wherein operating the power converter in the first state is operating the power converter in the full mode, wherein operating the power converter in the second state is operating the power converter in the intermediate burst mode, wherein operating the power converter in the third state and in the fourth state is operating the power converter in the light load burst mode, and wherein operating the power converter in the fifth state and in the sixth state is operating the power converter in the super light load burst mode.

What is claimed is:

1. A controller for use in a power converter, comprising:
    a control loop clock generator coupled to generate a switching frequency signal in response to a burst load threshold, a power signal, and a load signal responsive to an output load of the power converter, a switching frequency of the switching frequency signal is above a mechanical audio resonance range of an energy transfer element of the power converter and above an audible noise frequency;
    a burst control circuit coupled to generate a burst on signal, and a burst off signal in response to a feedback signal representative of an output of the power converter and a burst enable signal responsive to the burst load threshold and the load signal to operate the controller in a plurality of burst modes, wherein a burst frequency of the burst on signal or the burst off signal is less than the mechanical audio resonance range of the energy transfer element of the power converter; and
    a request transmitter circuit coupled to generate a request signal in response to the switching frequency signal, the burst on signal, and the burst off signal to control switching of a switching circuit coupled to the energy transfer element and an input of the power converter.

2. The controller of claim 1, further comprising:
    a burst load threshold circuit coupled to generate the burst load threshold in response to an input voltage signal representative of an input voltage of the power converter; and
    a first comparator coupled to generate the burst enable signal in response to a comparison of the burst load threshold and the load signal.

3. The controller of claim 2, wherein the input voltage signal and the power signal are combined into a single signal sensed from a primary winding of the energy transfer element.

4. The controller of claim 1, wherein the power signal is representative of one or more of a sensed output power of the power converter, power delivered by the energy transfer element, input power of the power converter, or power processed by the power converter.

5. The controller of claim 1, further comprising a transconductance amplifier having a first input coupled to receive the feedback signal, a second input coupled to receive a reference signal, and an output coupled to a compensation circuit coupled to an output return of the power converter, wherein the transconductance amplifier is coupled to generate the load signal in response to the feedback signal, the reference signal, and the compensation circuit.

6. The controller of claim 1, wherein the control loop clock generator comprises:
    a multiplexor having a first input coupled to receive the load signal, a second input coupled to receive the burst load threshold, and a select input coupled to receive a light load select signal;
    a reference generator coupled to an output of the multiplexor to generate a first clock reference signal and a second clock reference signal;
    a second comparator coupled to compare the first clock reference and the power signal;
    a third comparator coupled to compare the second clock reference and the power signal; and
    a latch having a reset input coupled to an output of the second comparator and a set input coupled to an output of the third comparator, wherein an output of the latch is coupled to generate the switching frequency signal.

7. The controller of claim 1, wherein the burst control circuit comprises:
    a burst thresholds circuit coupled to generate a first threshold signal, a second threshold signal, and a third threshold signal in response to the feedback signal;
    a burst timer circuit coupled to generate a first timer signal, a second timer signal, a third timer signal, and a fourth timer signal in response to the third threshold signal, the burst on signal, and the burst off signal; and
    a burst state machine coupled to generate the burst on signal, the burst off signal, and a light load select signal in response to the burst enable signal, the first threshold signal, the second threshold signal, the third threshold signal, the first timer signal, the second timer signal, the third timer signal, and the fourth timer signal.

8. The controller of claim 7, wherein the burst thresholds circuit comprises:
a fourth comparator coupled to generate the first threshold signal in response to a comparison of the feedback signal and a maximum value signal;
a fifth comparator coupled to generate the second threshold signal in response to a comparison of the feedback signal and a minimum value signal; and
a sixth comparator coupled to generate the third threshold signal in response to a comparison of the feedback signal and a regulation value signal.

9. The controller of claim 7, wherein the burst timer circuit comprises:
a logic gate coupled to be responsive to the third threshold signal and the burst off signal;
a counter having an enable input coupled to an output of the logic gate to generate a decay time signal;
a seventh comparator coupled to generate the first timer signal in response to a comparison of the decay time signal and a first threshold period;
an eighth comparator coupled to generate the second timer signal in response to a comparison of the burst off signal and a second threshold period;
a ninth comparator coupled to generate the third timer signal in response to a comparison of the burst off signal and a third threshold period; and
a tenth comparator coupled to generate the fourth timer signal in response to a comparison of the burst on signal and a fourth threshold period.

10. The controller of claim 7, wherein the burst state machine is coupled to operate in a plurality of states to operate the controller in the plurality of burst modes, wherein the plurality of burst modes includes a full mode, an intermediate burst mode, a light load burst mode, and a super light load burst mode.

11. The controller of claim 10, wherein burst state machine is coupled to operate in a first state to operate the controller in the full mode with the burst on signal asserted and with the switching frequency signal responsive to a value of the load signal.

12. The controller of claim 11, wherein the burst state machine is coupled to transition from the first state to a second state in response to the burst enable signal being asserted or in response to a comparison of the burst off signal and a second threshold period, wherein the burst state machine is coupled to operate in the second state to operate the controller in the intermediate burst mode with the burst off signal asserted, a fixed burst period substantially fixed to the second threshold period, and a burst on period is equal to a difference between the second threshold period and a burst off period.

13. The controller of claim 12, wherein the burst state machine is coupled to transition from all states back to the first state in response to the burst enable signal being deasserted or in response to a comparison of the feedback signal and a minimum value signal.

14. The controller of claim 12, wherein the burst state machine is coupled to transition from the second state to a third state in response to a comparison of a time decay signal and a first threshold period, wherein the burst state machine is coupled to operate in the third state to operate the controller in the light load burst mode with the burst on signal asserted and with the switching frequency signal responsive to a value of the burst load threshold.

15. The controller of claim 14, wherein the burst state machine is coupled to transition from the third state to a fourth state in response to a comparison of the feedback signal and a maximum value signal, wherein the burst state machine is coupled to operate in the fourth state to operate the controller in the light load burst mode with the burst off signal asserted, and wherein the burst state machine is coupled to transition from the fourth state back to the third state in response to a comparison of the feedback signal and a minimum value signal.

16. The controller of claim 15, wherein the burst state machine is coupled to transition from the fourth state to a fifth state in response to the burst off period reaching a third threshold period, wherein the burst state machine is coupled to operate in the fifth state to operate the controller in the super light load burst mode with the burst on signal asserted, the fixed burst period substantially fixed to a sum of the third threshold period and a fourth threshold period, and the switching frequency signal is substantially equal to either a fixed burst load threshold value or a maximum switching frequency.

17. The controller of claim 16, wherein the burst state machine is coupled to transition from the fifth state to a sixth state in response to the burst on period reaching the fourth threshold period, wherein the burst state machine is coupled to operate in the sixth state to operate the controller in the super light load burst mode with the burst off signal asserted, and the fixed burst period substantially fixed to the sum of the third threshold period and the fourth threshold period, wherein the burst state machine is coupled to transition from the sixth state back to the fifth state in response to the burst off period reaching a third threshold period, and wherein the burst state machine is coupled to transition from the sixth state back to the third state in response to the burst off period falling below the third threshold period.

18. A power converter, comprising:
an energy transfer element coupled between an input of the power converter and an input of the power converter;
a switching circuit coupled to energy transfer element and the input of the power converter; and
a controller coupled to control switching of the switching circuit to control a transfer of energy from an input of the power converter to the output of the power converter, wherein the controller includes:
a control loop clock generator coupled to generate a switching frequency signal in response to a burst load threshold, a power signal, and a load signal responsive to the output load of the power converter, a switching frequency of the switching frequency signal is greater than a mechanical audio resonance range of the energy transfer element and above an audible noise frequency;
a burst control circuit coupled to generate a burst on signal, and a burst off signal in response to a feedback signal representative of the output of the power converter and a burst enable signal responsive to the burst load threshold and the load signal to operate the controller in a plurality of burst modes, wherein a burst frequency of the burst on signal or the burst off signal is less than the mechanical audio resonance range of the energy transfer element and less than an audible noise frequency;
and
a request transmitter circuit coupled to generate a request signal in response to the switching frequency signal, the burst on signal, and the burst off signal to control switching of the switching circuit.

19. The power converter of claim 18, wherein the power converter is a resonant converter, wherein the power converter further comprises a resonant tank circuit including a tank inductance coupled to a tank capacitance coupled to the switching circuit, wherein the switching circuit includes a high side switch and a low side switch coupled to the resonant tank circuit.

20. The power converter of claim 19, wherein the controller is a secondary controller, wherein the power converter further comprises a primary controller galvanically isolated from the secondary controller, wherein the primary controller is coupled to receive the request signal from the secondary controller to generate a high side drive signal to control switching of the high side switch, and a low side drive signal to control switching of the low side switch.

21. The power converter of claim 18, wherein the controller further comprises:
a burst load threshold circuit coupled to generate the burst load threshold in response to an input voltage signal representative of an input voltage of the power converter; and
a first comparator coupled to generate the burst enable signal in response to a comparison of the burst load threshold and the load signal.

22. The power converter of claim 18, further comprising a compensation circuit coupled to an output return of the power converter, wherein the compensation circuit comprises:
a resistor coupled to a first capacitor coupled between the output return of the power converter and the controller; and
a second capacitor coupled in parallel across the resistor and the first capacitor.

23. The power converter of claim 22, wherein the controller further comprises a transconductance amplifier having a first input coupled to receive the feedback signal, a second input coupled to receive a reference signal, and an output coupled to the compensation circuit, wherein the transconductance amplifier is coupled to generate the load signal in response to the feedback signal, the reference signal, and the compensation circuit.

24. The power converter of claim 18, wherein the control loop clock generator comprises:
a multiplexor having a first input coupled to receive the load signal, a second input coupled to receive the burst load threshold, and a select input coupled to receive a light load select signal;
a reference generator coupled to an output of the multiplexor to generate a first clock reference signal and a second clock reference signal;
a second comparator coupled to compare the first clock reference and the power signal;
a third comparator coupled to compare the second clock reference and the power signal; and
a latch having a reset input coupled to an output of the second comparator and a set input coupled to an output of the third comparator, wherein an output of the latch is coupled to generate the switching frequency signal.

25. The power converter of claim 18, wherein the burst control circuit comprises:
a burst thresholds circuit coupled to generate a first threshold signal, a second threshold signal, and a third threshold signal in response to the feedback signal;
a burst timer circuit coupled to generate a first timer signal, a second timer signal, a third timer signal, and a fourth timer signal in response to the third threshold signal, the burst on signal, and the burst off signal; and
a burst state machine coupled to generate the burst on signal, the burst off signal, and a light load select signal in response to the burst enable signal, the first threshold signal, the second threshold signal, the third threshold signal, the first timer signal, the second timer signal, the third timer signal, and the fourth timer signal.

26. The power converter of claim 25, wherein the burst thresholds circuit comprises:
a fourth comparator coupled to generate the first threshold signal in response to a comparison of the feedback signal and a maximum value signal;
a fifth comparator coupled to generate the second threshold signal in response to a comparison of the feedback signal and a minimum value signal; and
a sixth comparator coupled to generate the third threshold signal in response to a comparison of the feedback signal and a regulation value signal.

27. The power converter of claim 25, wherein the burst timer circuit comprises:
a logic gate coupled to be responsive to the third threshold signal and the burst off signal;
a counter having an enable input coupled to an output of the logic gate to generate a decay time signal;
a seventh comparator coupled to generate the first timer signal in response to a comparison of the decay time signal and a first threshold period;
an eighth comparator coupled to generate the second timer signal in response to a comparison of the burst off signal and a second threshold period;
a ninth comparator coupled to generate the third timer signal in response to a comparison of the burst off signal and a third threshold period; and
a tenth comparator coupled to generate the fourth timer signal in response to a comparison of the burst on signal and a fourth threshold period.

28. The power converter of claim 25, wherein the burst state machine is coupled to operate the controller in the plurality of burst modes, wherein the plurality of burst modes includes a full mode, an intermediate burst mode, a light load burst mode, and a super light load burst mode.

29. The power converter of claim 28, wherein burst state machine is coupled to operate controller in the full mode with the burst on signal asserted and with the switching frequency signal responsive to a value of the load signal.

30. The power converter of claim 29, wherein the burst state machine is coupled to transition the controller from operating in the full mode to the controller operating in the intermediate burst mode in response to the burst enable signal being asserted or in response to a comparison of the burst off signal and a second threshold period.

31. The power converter of claim 30, wherein the burst state machine is coupled to transition the controller from operating in the intermediate burst mode, the light load burst mode, or the super light burst mode to operating in the full mode in response to the burst enable signal being deasserted or in response to a comparison of the feedback signal and a minimum value signal.

32. The power converter of claim 31, wherein the burst state machine is coupled to transition the controller from operating in the intermediate burst mode to the controller operating in the light load burst mode in response to a comparison of a time decay signal and a first threshold period.

33. The power converter of claim 32, wherein the burst state machine is coupled to transition the controller from operating in the light load burst mode to the controller operating in the super light load burst mode in response to the burst off period reaching a third threshold period.

34. The power converter of claim 33, wherein the burst state machine is coupled to transition the controller from operating in the super light load burst mode to the controller operating in the light load burst mode in response to the burst off period falling below the third threshold period.

35. A method of controlling a power converter having a plurality of burst modes, comprising:
operating the power converter in a first state with a burst on signal asserted and with a switching frequency signal responsive to a value of a load signal;
operating the power converter in a second state with a burst off signal asserted, a fixed burst period substantially fixed to a second threshold period, and a burst on period is equal to a difference between the second threshold period and a burst off period;
operating the power converter in a third state with the burst on signal asserted and with the switching frequency signal responsive to a value of the burst load threshold;
operating the power converter in a fourth state with the burst off signal asserted;
operating the power converter in a fifth state with the burst on signal asserted, the fixed burst period substantially fixed to a sum of a third threshold period and a fourth threshold period, and the switching frequency signal is substantially equal to either a fixed burst load threshold value or a maximum switching frequency; and
operating the power converter in a sixth state with the burst off signal asserted, and the fixed burst period substantially fixed to the sum of the third threshold period and the fourth threshold period.

36. The method of claim 35, further comprising transitioning back from the operating the power converter in the second state, the third state, the fourth state, the fifth state, or the sixth state to operating the power converter in the first state in response to a burst enable signal being deasserted or in response to a comparison of a feedback signal and a minimum value signal.

37. The method of claim 35, further comprising transitioning from operating the power converter in the first state to operating the power converter in the second state in response to a burst enable signal being asserted or in response to a comparison of the burst off signal and the second threshold period.

38. The method of claim 35, further comprising transitioning from operating the power converter in the second state to operating the power converter in the third state in response to a comparison of a time decay signal and a first threshold period.

39. The method of claim 35, further comprising transitioning from operating the power converter in the third state to operating the power converter in the fourth state in response to a comparison of a feedback signal and a maximum value signal, and transitioning from operating the power converter in the fourth state back to operating the power converter in the third state in response to a comparison of the feedback signal and a minimum value signal.

40. The method of claim 35, further comprising transitioning from operating the power converter in the fourth state to operating the power converter in the fifth state in response to the burst off period reaching the third threshold period.

41. The method of claim 35, further comprising transitioning from operating the power converter in the fifth state to operating the power converter in the sixth state in response to the burst on period reaching the fourth threshold period, transitioning from operating the power converter in the sixth state back to operating the power converter in the fifth state in response to the burst off period reaching the third threshold period, and transitioning from operating the power converter in the sixth state back to the third state in response to the burst off period falling below the third threshold period.

42. The method of claim 35, wherein the plurality of burst modes comprises a full mode, an intermediate burst mode, a light load burst mode, and a super light load burst mode, wherein operating the power converter in the first state is operating the power converter in the full mode, wherein operating the power converter in the second state is operating the power converter in the intermediate burst mode, wherein operating the power converter in the third state and in the fourth state is operating the power converter in the light load burst mode, and wherein operating the power converter in the fifth state and in the sixth state is operating the power converter in the super light load burst mode.

\* \* \* \* \*

UNITED STATES PATENT AND TRADEMARK OFFICE
CERTIFICATE OF CORRECTION

PATENT NO. : 11,081,966 B2  
APPLICATION NO. : 16/688660  
DATED : August 3, 2021  
INVENTOR(S) : R. Mayell et al.

Page 1 of 1

It is certified that error appears in the above-identified patent and that said Letters Patent is hereby corrected as shown below:

In the Claims

| Column | Line | |
| --- | --- | --- |
| 31 | 39 | change "burst" to -- the burst --. |
| 34 | 43 | change "burst" to -- the burst --. |
| 34 | 44 | change "controller" to -- the controller --. |
| 35 | 37 | change "from the" to -- from --. |
| 26 | 14 | change "and an input" to -- and an output --. |
| 26 | 15 | change "to energy" to -- to the energy --. |
| 26 | 18 | change "an" to -- the --. |

Signed and Sealed this  
Seventh Day of June, 2022

Katherine Kelly Vidal  
*Director of the United States Patent and Trademark Office*